Figure 5:
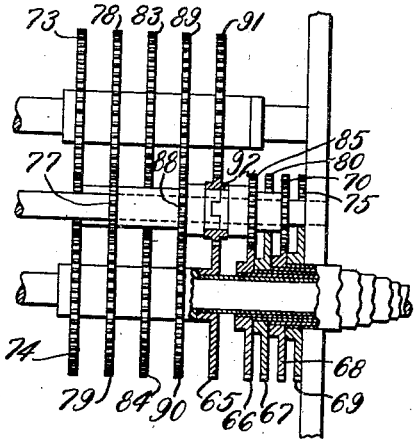

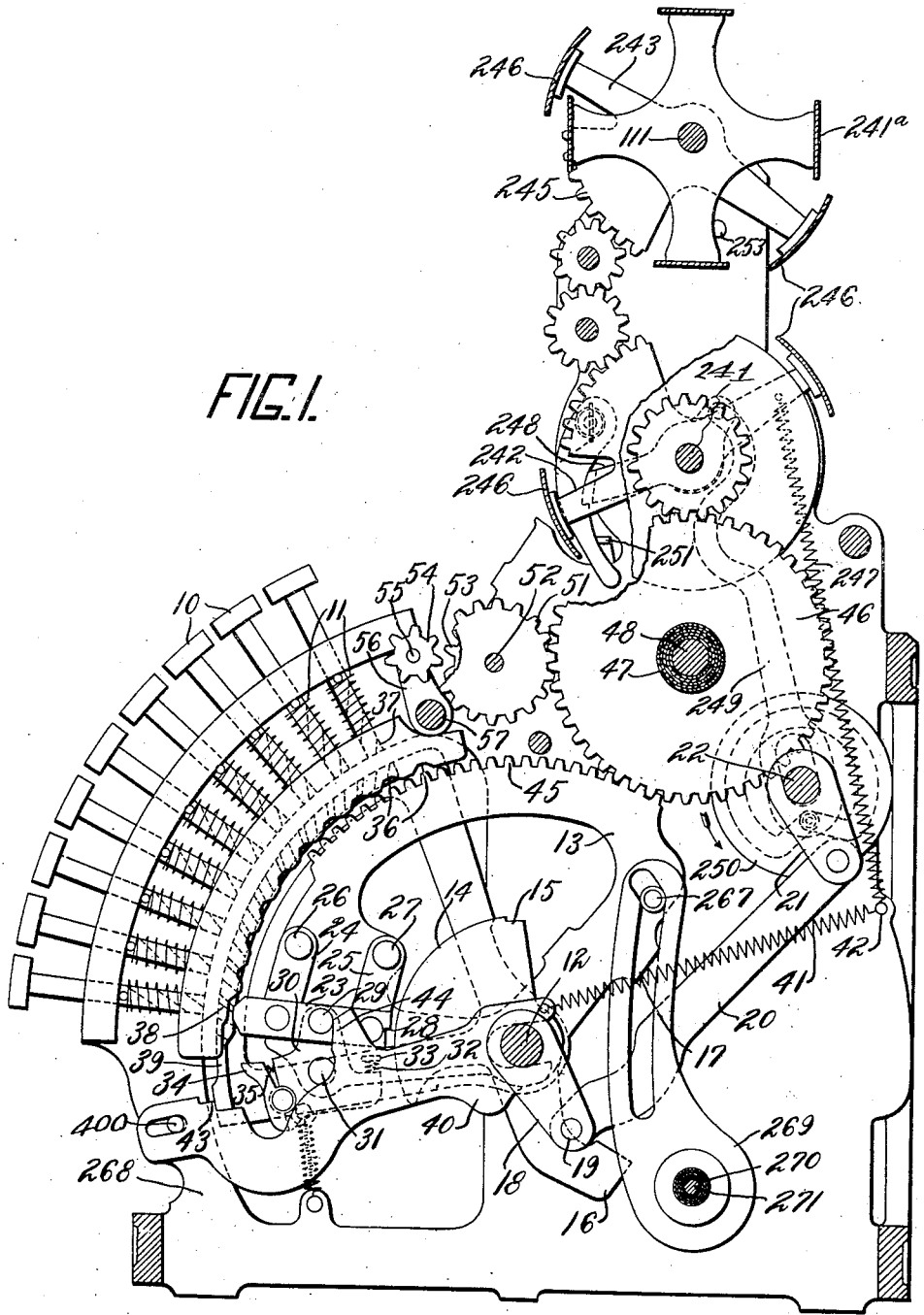

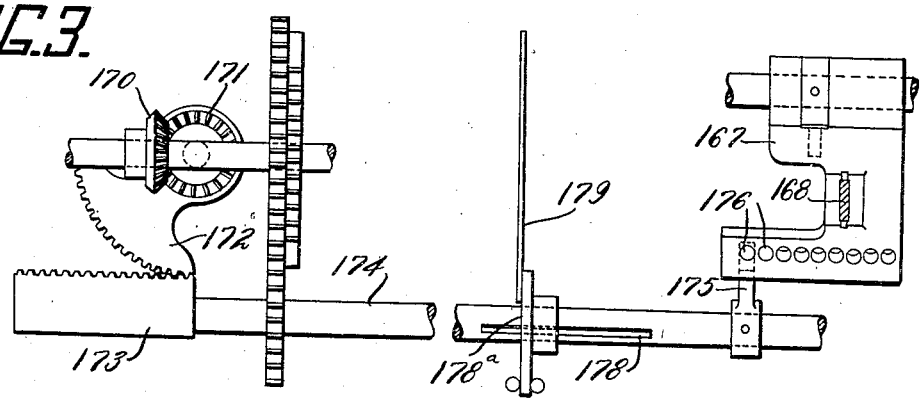
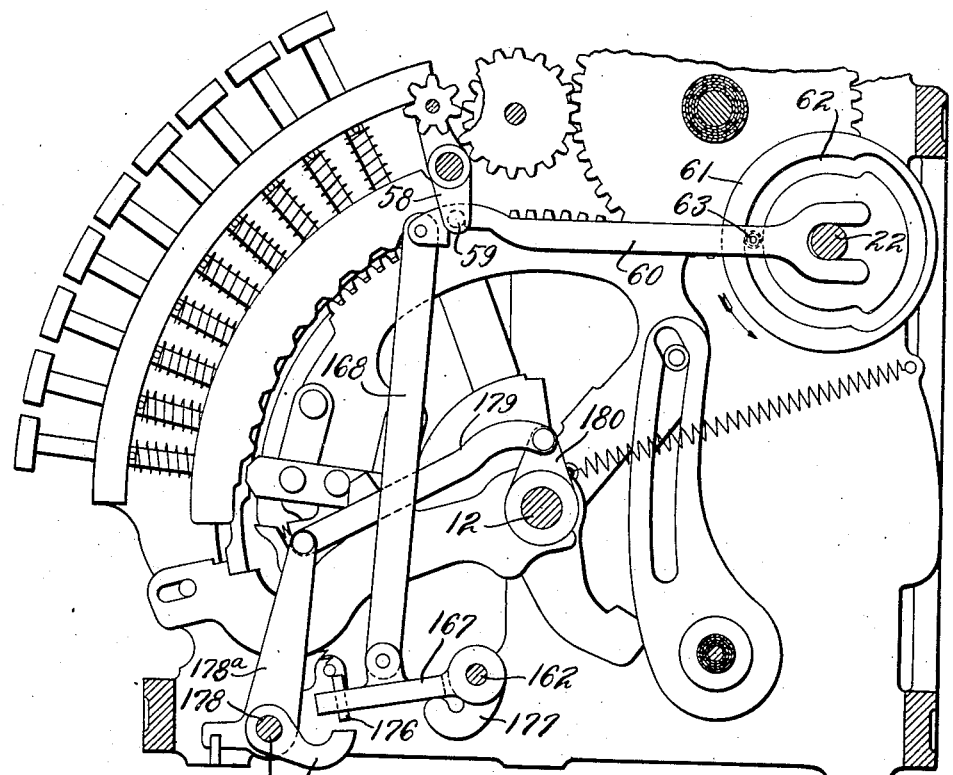

E. J. VON PEIN.
MULTIPLE REGISTER.
APPLICATION FILED APR. 6, 1912.

1,123,433.

Patented Jan. 5, 1915.
12 SHEETS—SHEET 3.

Witnesses
H. H. Sadgebury
W. M. McCarthy

Inventor
Edward J. Von Pein
by R. Chpless
and C. H. Bracelton
Attorneys

E. J. VON PEIN.
MULTIPLE REGISTER.
APPLICATION FILED APR. 6, 1912.
1,123,433.
Patented Jan. 5, 1915.
12 SHEETS—SHEET 4.
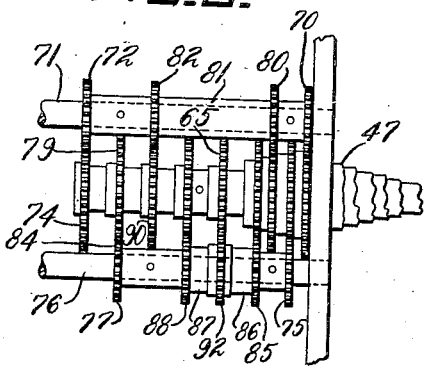
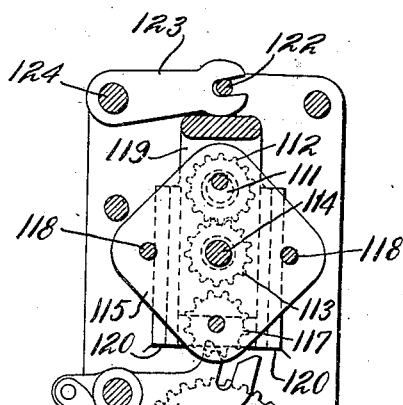
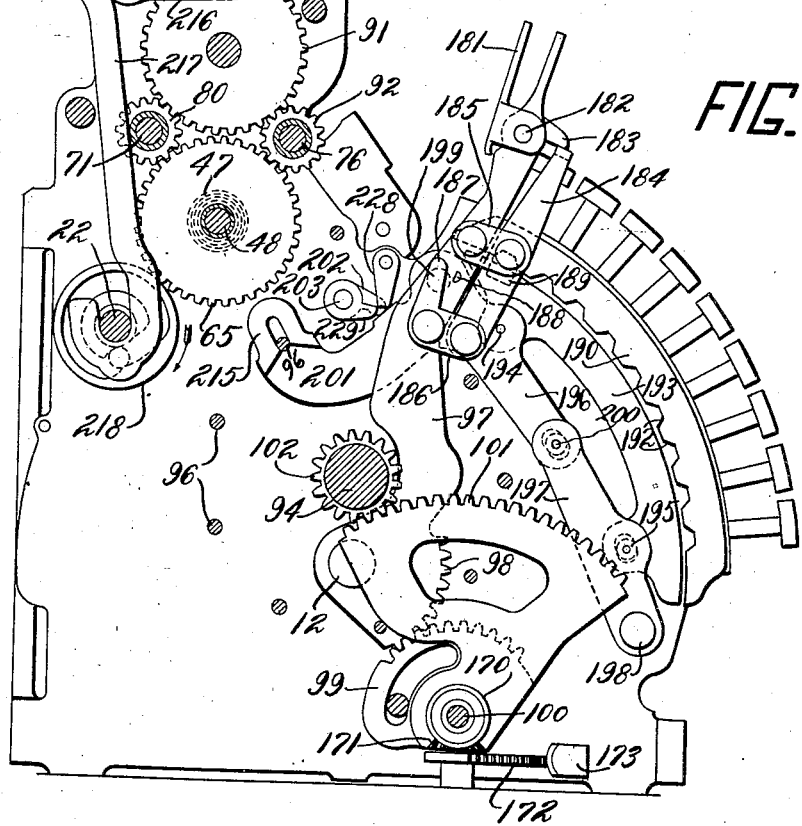
Witnesses
H. F. Sadgebury
W. M. McCarthy
Inventor
Edward J. Von Pein
by R. Chlara
and C. H. Bracelton
Attorneys

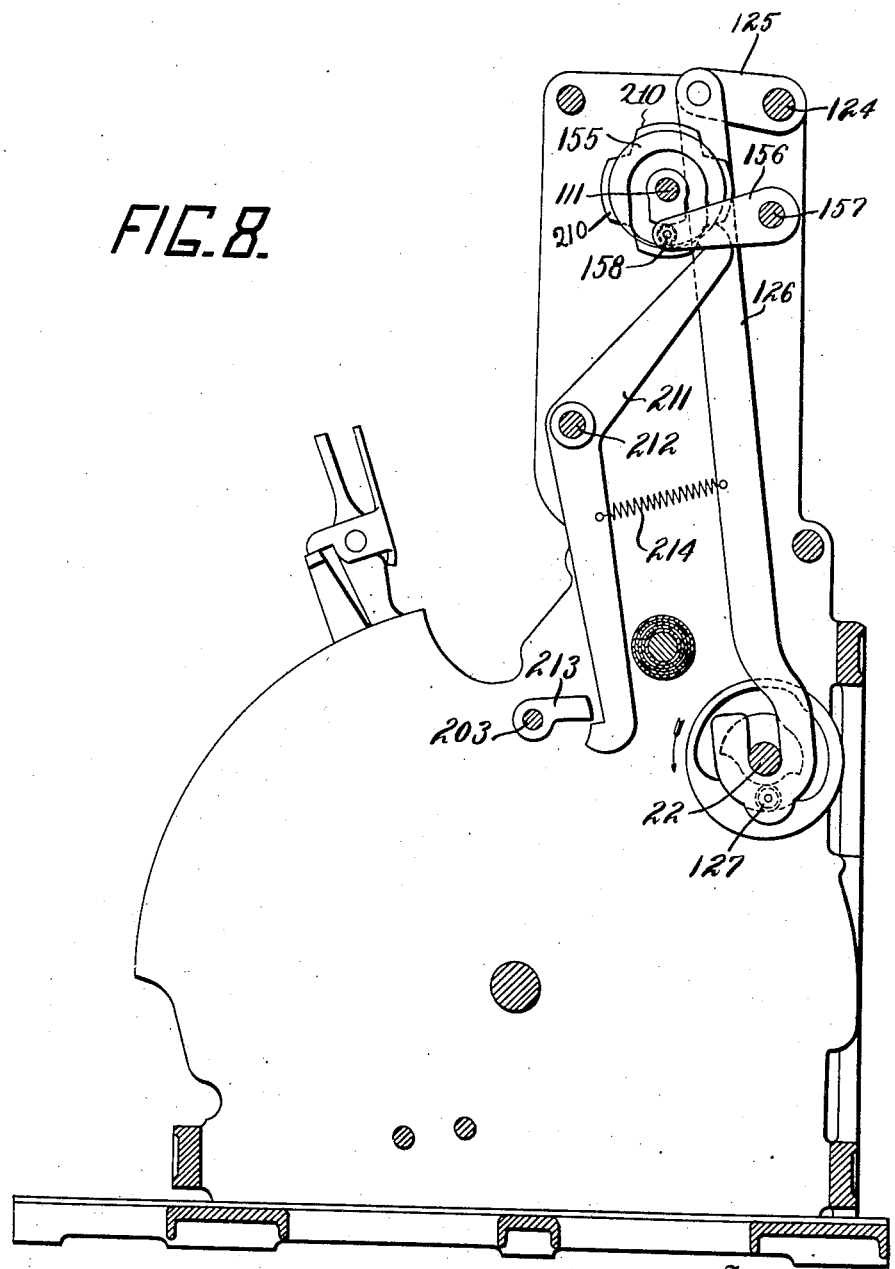

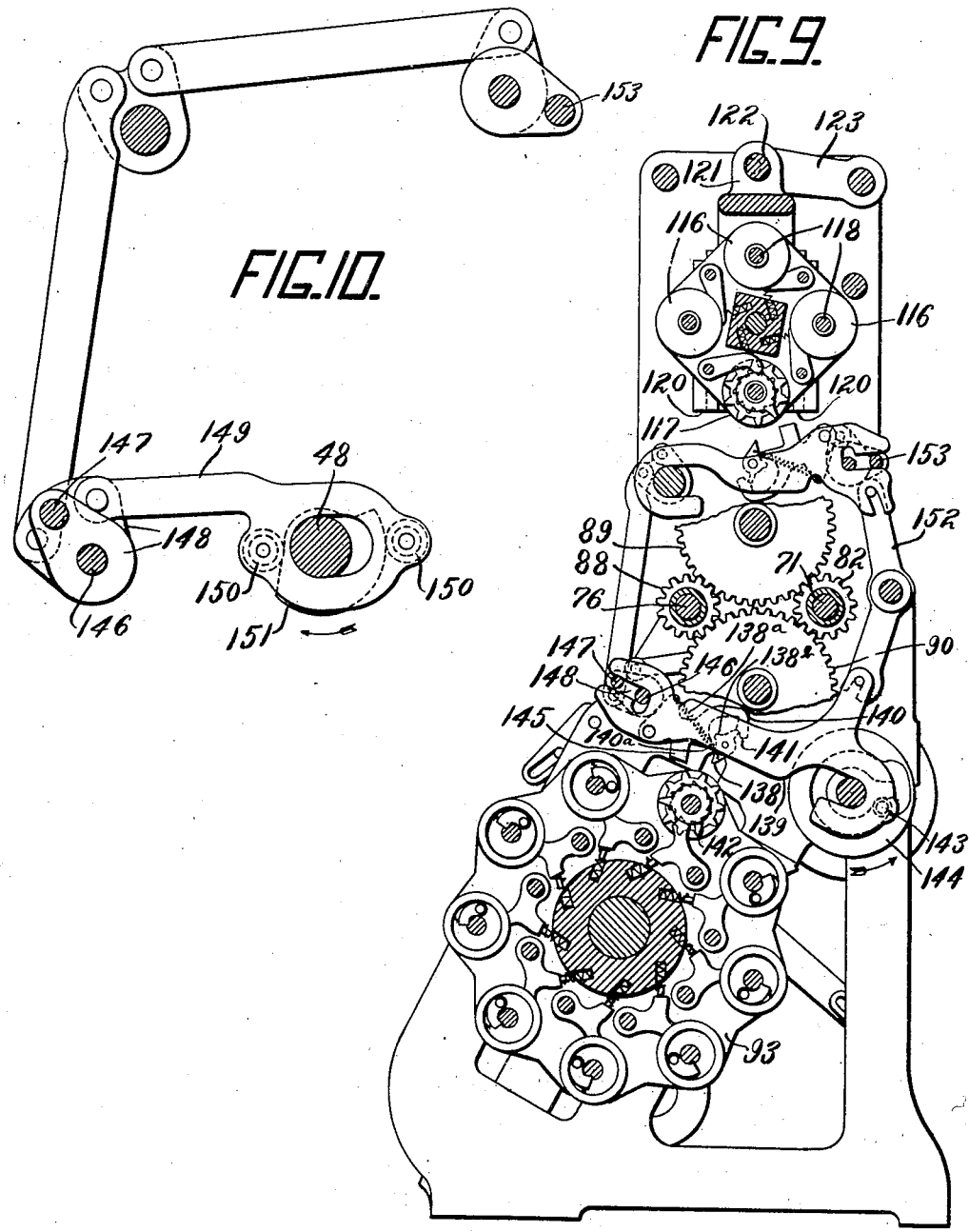

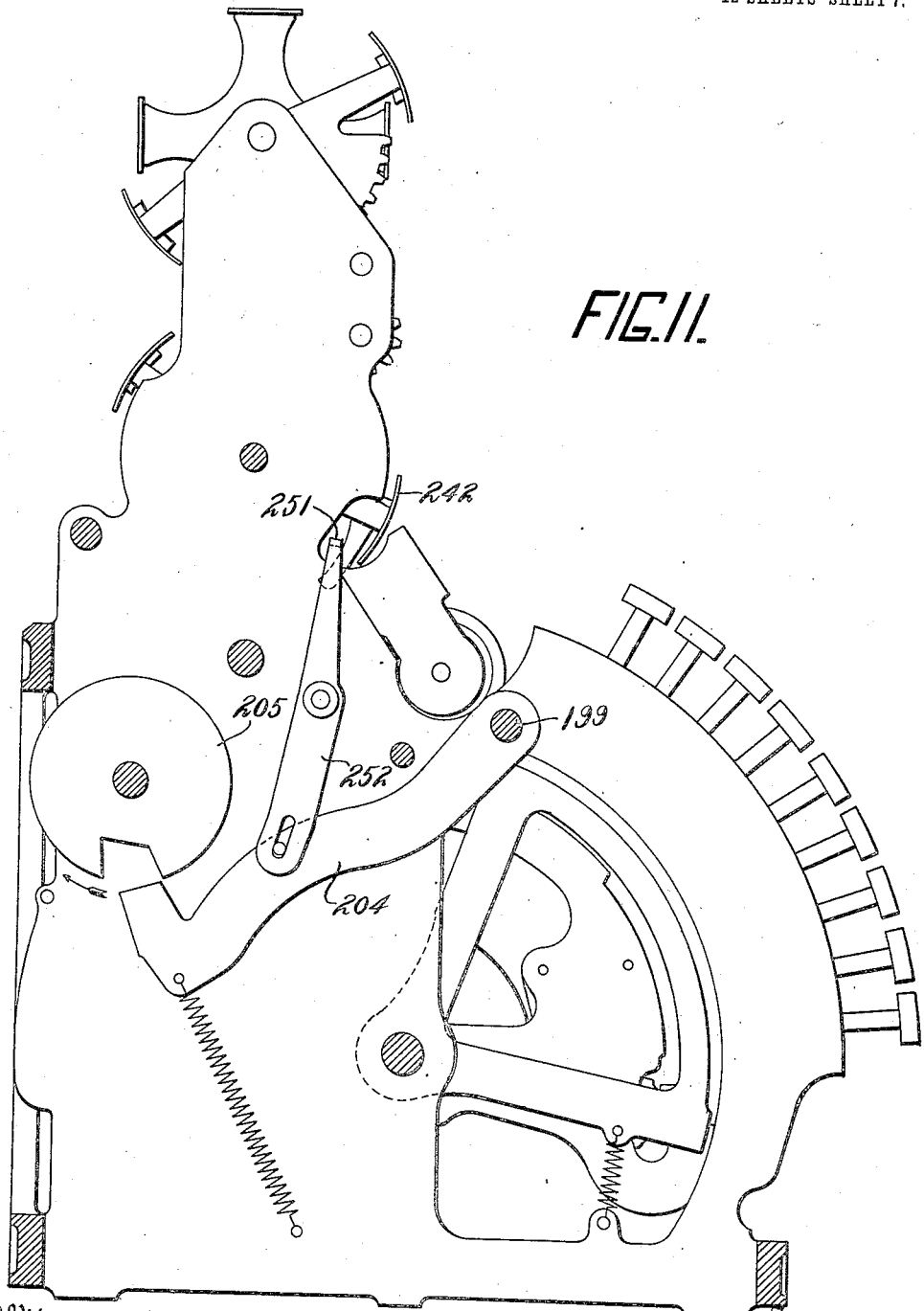

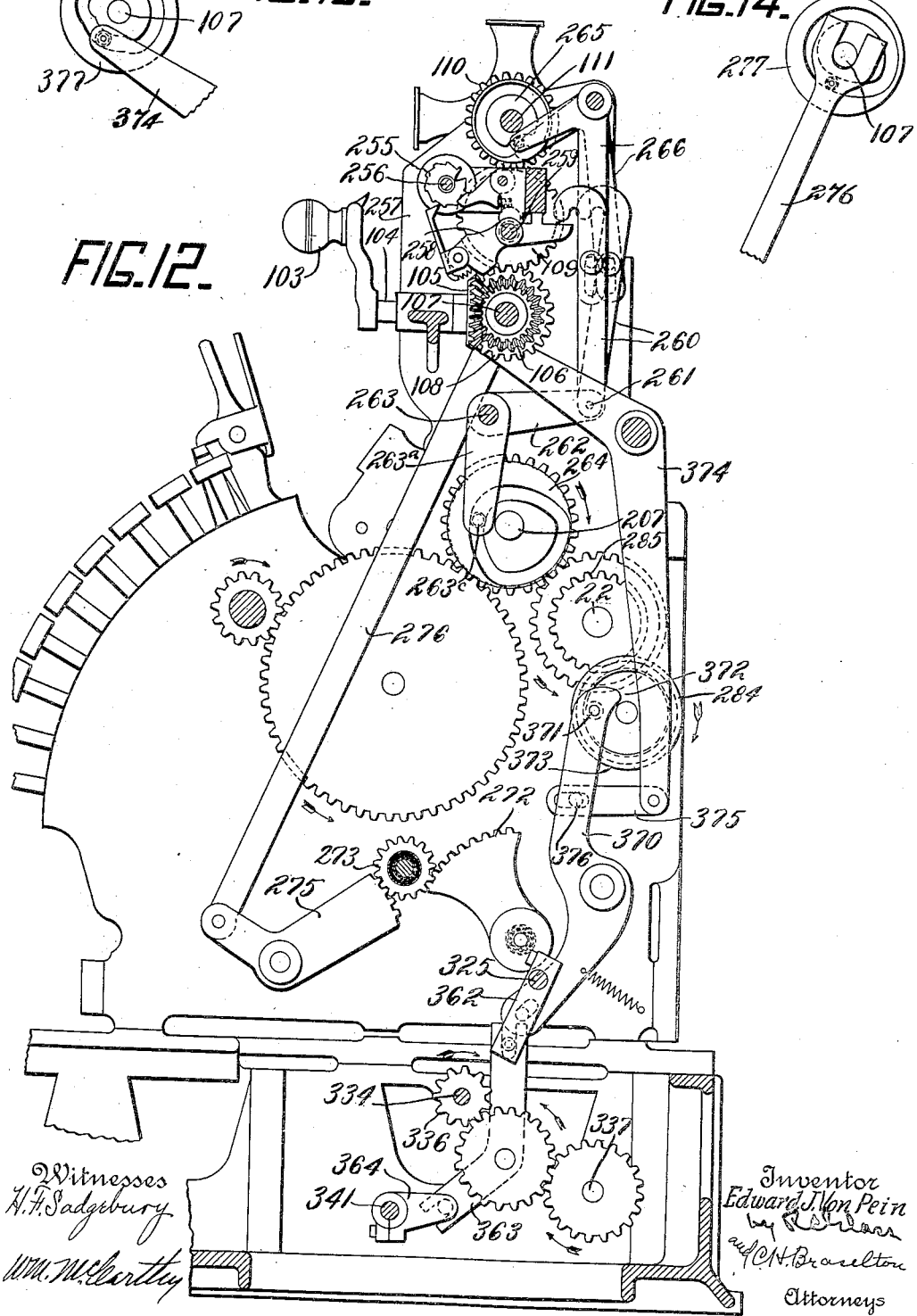
E. J. VON PEIN.
MULTIPLE REGISTER.
APPLICATION FILED APR. 6, 1912.
1,123,433.
Patented Jan. 5, 1915.
12 SHEETS—SHEET 8.

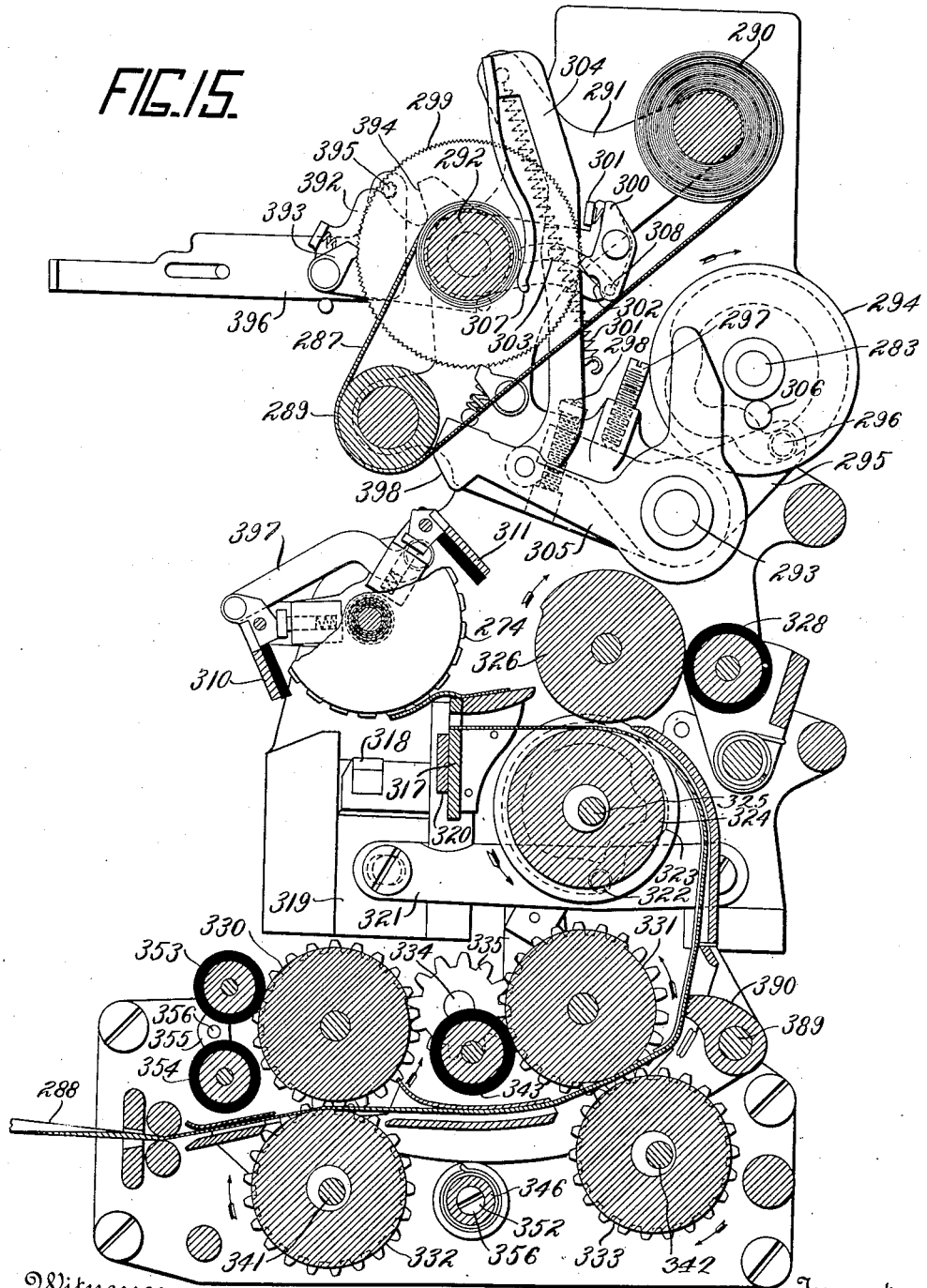

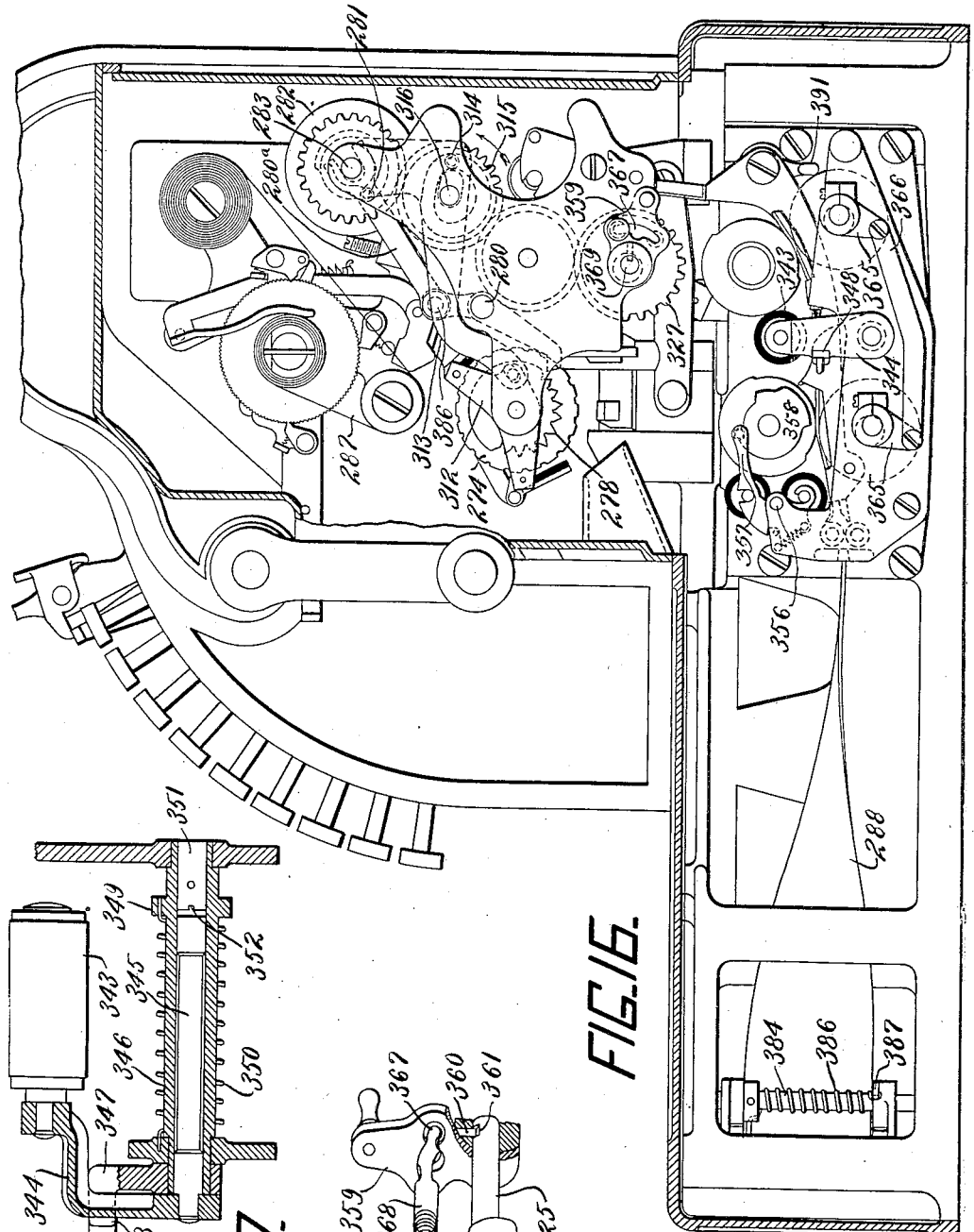

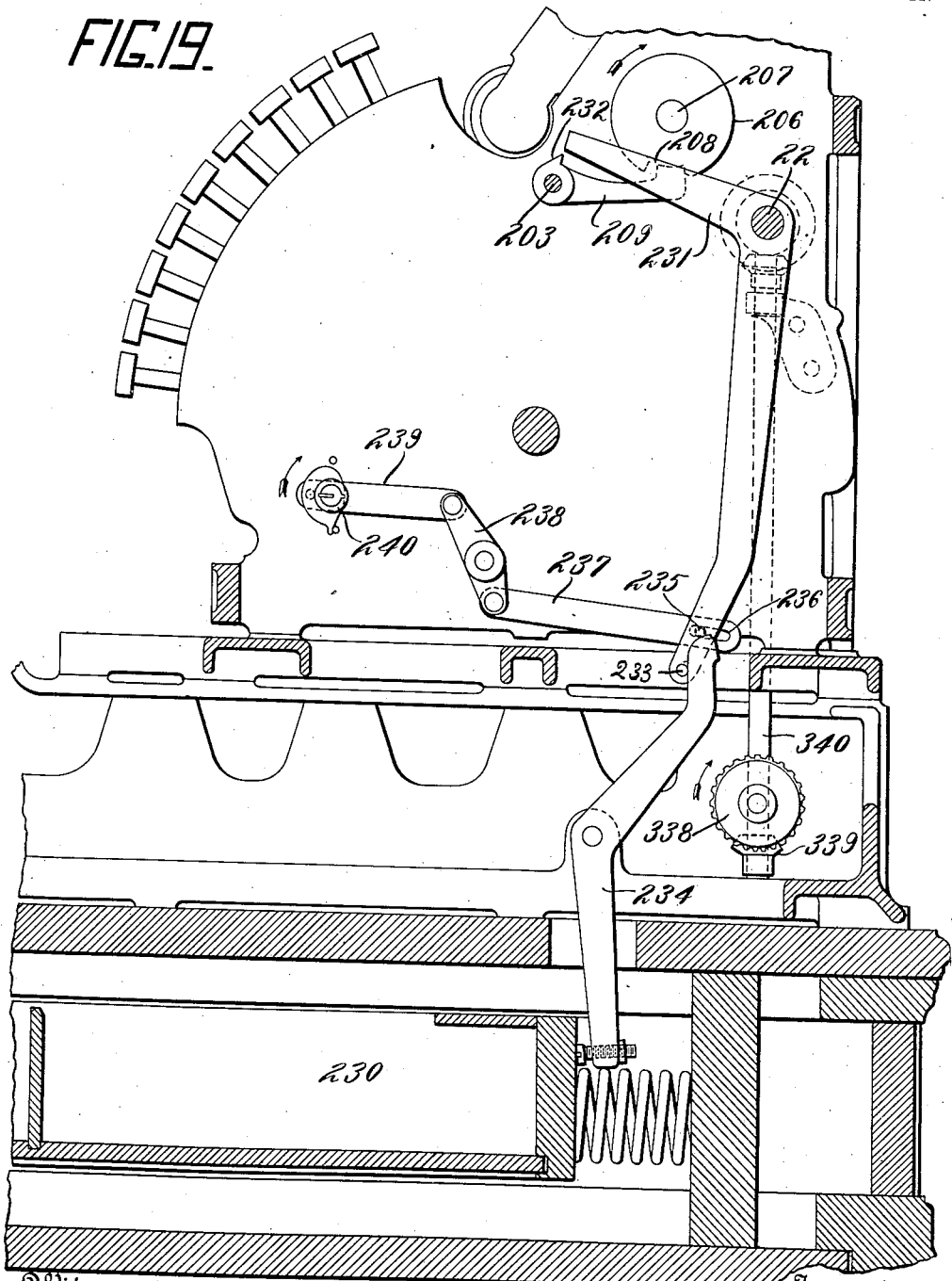

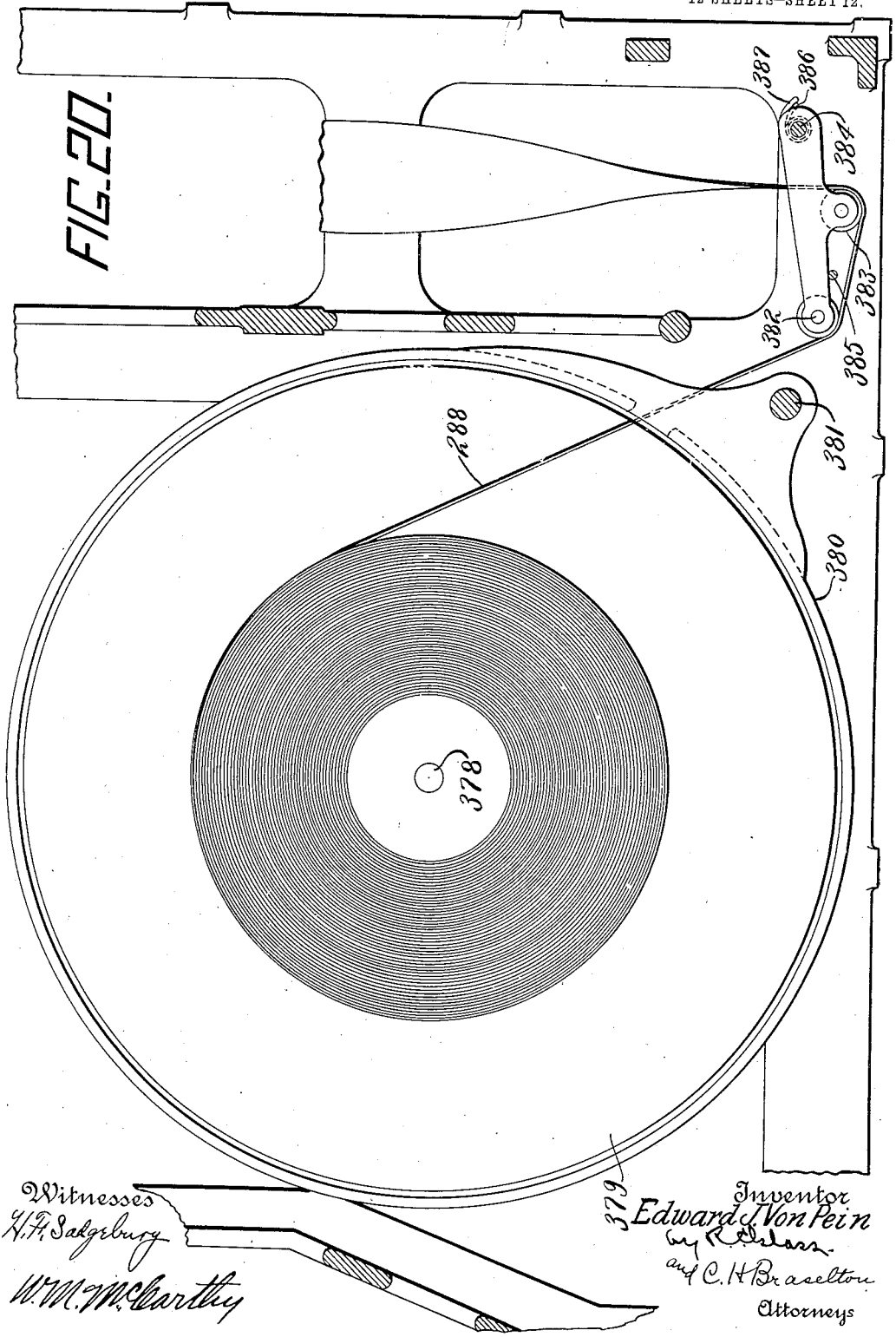

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

MULTIPLE REGISTER.

1,123,433.       Specification of Letters Patent.        Patented Jan. 5, 1915.

Application filed April 6, 1912. Serial No. 689,032.

*To all whom it may concern:*

Be it known that I, EDWARD J. VON PEIN, a citizen of the United States, residing at Dayton, in the county of Montgomery and State of Ohio, have invented certain new and useful Improvements in Multiple Registers, of which I declare the following to be a full, clear, and exact description.

This application covers the same subject matter contained in my prior application filed February 14, 1908, No. 415,959, which application became abandoned by failure to prosecute the same to issue within the time prescribed by the rules of practice of the United States Patent Office.

This invention relates to cash registers and more particularly to the type known as multiple or department.

Among the main objects of the invention are, to improve the general construction of multiple registers by providing a machine having totalizers for both clerks and departments or transactions, the construction being such that two totalizers may be actuated at once whereby amounts may be summed both with relation to the clerk and the department or kind of transaction.

An additional object is to provide a multiple register with two grand totalizers or main total adding devices so that the sums of different combinations of the remaining totalizers may be added.

Another object is to improve the construction by providing an auxiliary carrier or reel supporting an additional set of totalizers with locking mechanism for the machine, brought into operation if at any time the auxiliary carrier is out of operative position.

A further object is to improve the construction of the printing mechanism in general and among the parts which have been improved may be mentioned the strip feeding devices, the check holding device and the provision of a polychrome printing mechanism from which check advertisements in a plurality of colors of ink may be printed.

A further improvement consists in the provision of improved transfer devices for the totalizers whereby the operation of the transfer is made positive and is in no way dependent upon springs and to improve the turn to zero mechanism so that a plurality of totalizers may be restored to zero at one operation.

With these and incidental objects in view the invention consists in certain novel features of construction and combinations of parts, the essential elements of which are set forth in appended claims and a preferred form of embodiment of which is hereinafter described with reference to the drawings which accompany and form part of this specification.

Figure 4:
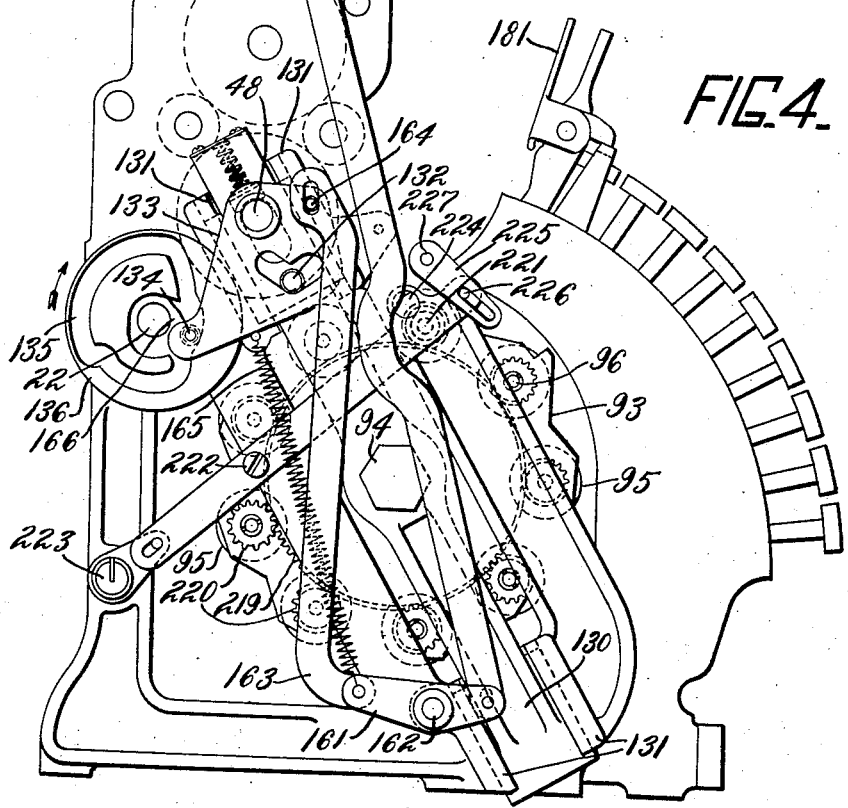

Of said drawings: Figure 1 is a transverse vertical section through the machine having the improvements of the present invention applied thereto. Fig. 2 is a detail section with parts broken away showing the throwout devices for preventing actuation of the grand totalizer. Fig. 3 is a detail top plan of some of the throwout parts shown in Fig. 2. Fig. 4 is an elevation of the left-hand end of the machine showing the main reel or totalizer carrier with the devices for preventing actuation of the totalizers when desired. Figs. 5 and 6 are respectively a front elevation and a plan of the actuating gearing for the totalizers. Fig. 7 is a vertical transverse section near the left hand end of the machine locking to the right and showing the mechanism for positioning the main totalizer carrier. Fig. 8 is a vertical section nearly on the line of Fig. 7 but looking in the opposite direction. Fig. 9 is a vertical transverse section looking to the left and showing the two reels and the transfer mechanism for the totalizers thereon. Fig. 10 is a detail of parts shown in Fig. 9 for moving the transfer devices. Fig. 11 is a vertical transverse section looking to the right and showing the means for locking the machine and for tripping the flash. Fig. 12 is a transverse vertical section near the right-hand end of the machine looking to the left and showing the main operating gearing and the operation counters for the auxiliary reel. Figs. 13 and 14 are details of cams hidden in Fig. 12. Fig. 15 is a vertical section through the printing mechanism. Fig. 16 is an end elevation from the right-hand end of the machine showing the printing mechanism. Fig. 17 is a detail partly in section of a removable ink roller for the check. Fig. 18 is a detail of the on and off device for the check feed. Fig. 19 is a vertical section with parts broken away showing means for locking the machine when the cash receptacle is open, and Fig. 20 is a plan view of the check strip receptacle and tension devices in the base of the machine.

The machine shown in the present invention is of a well known type now on the market which is completely illustrated and described in the patents issued to Thomas Carroll, No. 703,639, granted July 1, 1902, and to the present applicant, No. 938,527, granted November 2, 1909. In the machine of the patents is shown a cash register provided with a rotatable reel or totalizer carrier in which are mounted a plurality of totalizers so that any one of them may be brought into position to be actuated by a set of common actuating devices. The present improvement utilizes such a rotatable carrier and adds thereto a second rotatable reel herein shown as provided with four additional totalizers. With one reel it is evident that no two totalizers may be brought into operative position at once so that this construction attains the desirable result of permitting the addition of amounts entered in the register under two different headings. In the present case the totalizers on the main reel are assumed to be allotted to different clerks while the totalizers on the auxiliary reel will be implied to add amounts received on account, paid out and charged, together with a cash totalizer. It is obvious, however, that the totalizers may be assigned to other classifications without departing from the spirit of the present invention.

The printing mechanism of the machine as now on the market has been improved by the provision of mechanism whereby advertisements or other announcements may be printed on a strip of paper in a plurality of colors, clearly thus adding to the attractiveness of the printed matter on the paper.

*Differential mechanism.*—Describing the machine in general terms and referring to Fig. 1 it may be said that the machine comprises a plurality of banks of keys 10 mounted in a curved frame and adapted to be manually depressed against the tension of the springs 11. The main shaft 12 of the machine supports a plurality of differentially movable segments 13, one for each bank of keys, said segments being journaled loosely on the shaft and being adapted to be operated by operating segments 14 of which there is one for each segment 13. The segments 14 have notches 15 near their upper ends and are provided with depending extensions 16 adapted to engage projection 17 of the segments 13 to restore said segments to normal position. The main shaft 12 is operated by a crank arm 18 connected by a pin 19 to a pitman 20, which is connected to a crank arm 21 mounted rigidly on a rotatable shaft 22, which is adapted to be given a complete rotation at each operation of the machine. Mounted on each of the segments 13 are latches 23, which are connected to the segments by links or hangers 24 and 25 pivoted respectively on pins 26 and 27 on the segments 13, said latches 23 being thereby allowed movement radial to the shaft 12. At the rear ends of the latches 23 are projections 28 adapted to engage the notches 15 of the segments 14. A pin 29 is mounted on each of the latches 23, these pins 29 riding in slots of bell crank arms 30 mounted on pins 31 also carried by the segments 13. Spring 32 pressing against lugs 33 on segments 13 and against flanges on the bell cranks 30 tend to rock the said bell cranks so as to force the latches 23 rearwardly. At the lower forward end of each of the bell cranks 30 is mounted a by-pass pawl 34 pressed forwardly by a spring 35. Each key bank frame is provided with a series of depressions 36 in any one of which the forward beveled end of the coöperating latch 23 is adapted to be moved. The keys carry camming flanges 37 engaging cam slots 38 in segmental detents 39 and it will be clear from the construction shown that when a key in any bank is depressed the cam flange 37 thereof will raise the detent 39 of that respective bank. As the mechanism for each bank is identical with the one shown, only such description as is necessary to describe the operation of a single bank will be given. A retaining bar 40 straddles the main shaft 12 at its rear end and at its forward end is supported by a rod 400 and is drawn rearwardly by a spring 41 fastened to the rear end of said retaining bar 40 and to a rod 42. The retaining bar 40 is normally prevented from moving rearwardly by the key detent 39 which engages a cut away portion 43 thereof as shown in this figure. When, however, a key is depressed the detent 39 is raised sufficiently to carry the lower end thereof clear of the cut-away portion 43 of retaining bar 40. The bar 40 can then move rearwardly under tension of its spring 41 and lock the detent 39 in raised position and as the detent bar 40 moves rearwardly a projection 44 extending upwardly therefrom is moved away from the pin 29 of the sliding latch 23.

When the rotating shaft 22 is operated, the segments 14 are oscillated in a counter clock-wise direction and depending projections 16 thereof engage and restore the segments 13 to zero position through the projections 17 thereon, if the segments have in a previous operation been moved from normal position. When the notch 15 of the segment 14 reaches the projection 28, the latch 23 will move slightly rearward under impulse of the spring 32 and when segment 14 is then reversely moved to return it to the position shown in the figure, it will carry the latch 23 along with it thereby of course moving the segment 13. This motion continues until by-pass pawl 34 engages the shank of the depressed key 10, and such engagement rocks bell crank 30 around its pivot 31 thereby throwing the latch 23 forwardly until the projection 28 is disengaged from the notch 15 and the beveled forward end of said latch 23 engages one of the depressions 36 of the keyboard frame locking the segment 13 and all parts carried or moved thereby in adjusted position. The locking is of course assisted by the edge of segment 14, in its continued movement, passing behind projection 28. The segments 13 carry racks 45 which engage gears 46 fast on sleeves 47 surrounding shaft 48. The sleeves 47 extend through the machine to the multiple counter mechanism as will be later described. It will be clear that the sleeves 47 move in correspondence with the segments 13 and are restored to normal position and then set to a new position at each operation of the machine.

The gears 46 mesh with gears 51 of the main totalizer loosely mounted on a shaft 52 and secured to another set of loosely mounted gears 53. A set of gears (not shown) similar to gears 53 are secured to counter wheels mounted on shaft 52. The counter wheels are actuated in one direction in correspondence with the movement of gears 51 by pinions 54 carried in a frame, comprising the rod 55 and frame arms 56, said frame being pivoted on a shaft 57. The pinions 54 are wide enough to connect the gears 53 and their companion gears which are secured to the counter wheels. A depending arm 58 of said frame (Fig. 2) carries a pin 59 which is adapted to be moved forwardly and then rearwardly at each operation of the machine by a link 60 having a notch surrounding said pin 59 and supported thereby at its forward end, its rearward end straddling the rotation shaft 22. This shaft 22 carries a disk 61 having a cam groove 62 cut therein and riding in this groove is an anti-friction roller 63 carried by the link 60. The shape of the cam groove is clearly such as to move the link forward after about one-fourth of a rotation has been given the disk to retain it in its forward position for a further part of the rotation and to then restore it again to normal rearward position. This forward movement of link 60 takes place after the segments 13 and gears 51 have been returned to normal position and the pinions 54 are then thrown into mesh with gears 53 and the counter gears and retained in mesh while the segments 13 and the gears 53 are set to their new positions, thus adding the desired amount on the main totalizer. On the outer ends of the sleeves 47 (Figs. 5, 6 and 7) are mounted gear wheels in the following order, units of cents wheel 65, tens of cents wheel 66, dollars wheel 67, tens of dollars wheel 68, and hundreds of dollars wheel 69.

It will be understood that in machines of this kind the bank of keys of the lowest denomination,—that is, the "cents bank"—is generally placed near the right hand side of the machine. To the left of the cents bank is the "tens of cents bank," then the "dollars-bank," etc. As the sleeves 47 necessarily transmit movement of their respective segments in reverse order, it is necessary to employ a series of connecting pinions and sleeves intermediate the actuating gears and the gears 65, 66, 67, 68 and 69 to have the actuating gears in the proper order. The pinion and sleeve connections are arranged as follows. The hundreds of dollars gear wheel 69 meshes with a gear pinion 70 which is secured to a shaft 71 on which is also secured a gear pinion 72 meshing with the hundreds of dollars actuating gears 73 and 74. The tens of dollars gear wheel 68 meshes with a gear pinion 75 which is secured to a shaft 76 on which is also secured a gear pinion 77 meshing with the tens of dollars actuating gears 78 and 79. The dollars gear wheel 67 meshes with gear pinion 80 which is secured to one end of a sleeve 81 surrounding the shaft 71. On the opposite end of sleeve 81 is secured a gear pinion 82 which meshes with the dollars actuating gears 83 and 84. The tens of cents gear wheel 66 meshes with a gear pinion 85 which is secured to a short sleeve 86 on the shaft 76. Between the sleeve 86 and a similar sleeve 87 is a tongue and groove connection and on sleeve 87 is a gear pinion 88 which meshes with the tens of cents actuating gears 89 and 90. The units of cents gear wheel 65 is in correct position to be utilized as an actuating gear therefore it is only necessary to connect it to the units of cents actuating gear 91 of the upper set of actuating gears which is done by mounting a gear pinion 92 in a recess which is cut at the tongue and groove connection of the sleeves 86 and 87, the said gear pinion 92 meshing with the actuating gears 65 and 91.

*Totalizers.*—Referring to Figs. 4 and 7, it will be seen that there are provided two rotatable reels in each of which are mounted a series of totalizers. These reels are each rotated by separate hand levers to bring the desired totalizer into operative relation with their respective actuating gears and are then reciprocated to bring the totalizers into mesh with said gears. The actuating gears being operated by the differential mechanism of the register will actuate the totalizers an amount corresponding to the amounts of the keys depressed. The main reel 93 is mounted on a shaft 94 and as shown there are nine totalizers 95 each mounted on separate shafts 96. Hereinafter this reel will be spoken of as the main reel carried in the reel. The mechanism for rotating the main reel 93 is best shown in Fig. 7 and comprises a lever 97 loosely mounted on the shaft 12. The lever 97 has formed thereon a segment 98 which gears with a segment 99 mounted fast on a shaft 100. Also movable with segment 99 and mounted fast on the shaft 100 is a large segment 101 meshing with a gear 102 fast on the reel. It will be clear that as the lever 97 is oscillated over a scale on the front of the machine that the desired totalizer 95 may be brought into operative relation with the lower set of operating gears 74, 79, 84, 90 and 65.

Referring to Fig. 12, the setting mechanism for the auxiliary reel will be described. There is provided a revoluble handle 103 mounted on a short shaft 104. On the inner end of said shaft is secured one of a pair of beveled pinions 105 and 106, the pinion 106 being secured to a shaft 107 having a spur gear 108 mounted thereon. Said gear is connected to another gear 110 which is secured to a special indicator shaft 111 through an intermediate gear 109. It will be clear from this construction that the movement of the handle 103 is transmitted to the shaft 111.

Referring to Fig. 7 it will be seen that the shaft 111 has mounted on its other end a pinion 112 meshing with another pinion 113 which is secured to the shaft 114 upon which is mounted the auxiliary reel 115. Said reel, as shown, is provided with four totalizers, three of which numbered 116 (Fig. 9) are special transaction totalizers and one totalizer numbered 117 of which is a cash totalizer, each totalizer being mounted on a separate shaft 118 carried in said auxiliary reel and being adapted to be operated upon by the upper set of actuating gears 73, 78, 83, 89 and 91.

As hereinbefore mentioned the reels are reciprocated to bring the totalizers into mesh with the actuating gears. These reciprocating devices while separate are so timed as to act simultaneously. For the auxiliary reel this device consists of a bracket 119 (Fig. 7) mounted to slide in groove ways 120 on the framework of the machine. Extending upwardly from said bracket are wings 121 (Fig. 9) in which is pivoted a shaft 122 whose ends are formed eccentric to the body of said shaft. Straddling these eccentric ends of the shaft 122 are forked arms 123 which are secured to a shaft 124 on which is mounted an arm 125 (Fig. 8). Connected to the arm 125 is a pitman 126, the lower end of the pitman straddling the rotation shaft 22 and being provided with an anti-friction roller 127. This roller 127 is engaged by a cam groove of a cam disk 128 which reciprocates the pitman 126 and causes a rocking movement to be imparted to the shaft 124 whereby through the forked arms 123 the auxiliary reel bracket is reciprocated. The eccentric ends of the shaft 122 form means for adjusting the reciprocation of the auxiliary reel.

The reciprocating device for the main reel is shown in Fig. 4 and consists of a reciprocating bracket or frame 130 in which the reel shaft 94 is secured. This bracket or frame is adapted to reciprocate in grooved way 131 and is provided with an anti-friction roller 132 which is operated upon by an angular slot formed in a swinging plate 133 which is pivoted loosely on the shaft 48. A cam groove 135 of a cam disk 136 which is mounted on the rotation shaft 22, engages the anti-friction roller 134 and rocks the plate 133 around its pivot thereby causing the camming upward of the reciprocating bracket 130 carrying the main reel. By examining the formation of the cam 128 it will be seen that both reciprocating mechanisms operate simultaneously and that they are first given a full reciprocating movement to cause the totalizers to mesh with the actuating gears. This position is retained until nearly three quarters of a rotation of the shaft 22 has been given when both reels recede from their actuating gears so that they are fully out of mesh. At this time the transfer takes place after which the reels are returned to normal position, the transferring position being intermediate between the normal position and the position in gear with the racks. Each of the totalizers of both reels consist of wheels having fastened thereto pinions which are adapted, when the totalizer is in operative position, to be engaged and operated to rotate the totalizer wheels, by the actuating gears, (Fig. 9). When any one of the wheels have made a complete rotation, tripping projections thereon engage and operate trip pawls 138, each one of which is pivoted to and carried by transfer slides 139.

The trip pawls 138 are normally held up in normal position, as shown in Fig. 9, by the transfer pawls 140, which are each mounted on one of the transfer slides 139. Said trip pawls resting against shoulders 141 formed in the transfer pawls. Coil spring 138ª normally holds the trip and transfer pawls in engagement. Retrograde movement of the counter wheels is prevented by ratchets 142 secured thereto and engaged by suitable retaining pawls as shown. The transfer slides 139 have secured to their rearward ends anti-friction rollers 143 which are engaged by cam grooves in a series of transfer cams 144. These cams are so formed that the transfer movement of the dollars transfer slide does not take place until the transfer slide of the dimes bank has completed its transfer movement and the transfer movement of the tens of dollars transfer slide does not take place until the transfer slide of the dollars bank has completed its transfer movement, etc.

When the totalizer is in operative position and one of its wheels have made a complete rotation, its particular tripping projection will contact with the respective trip pawl 138, and thereby permit its spring to swing the proper transfer pawl down from normal position, and a spur 145, secured to the lower leg of the transfer pawl, will lie in the path of the teeth of the ratchet wheel 142, and when the transfer slide 139 is subsequently reciprocated the said spur will strike the ratchet teeth and turn the ratchet wheel and the wheel which is carried thereby, one notch, and thereby effect the transfer from the wheel of one denomination to the wheel of the next higher denomination. While a transfer is being thus effected the spur 145 is engaged with the periphery of the ratchet wheel 142, and the transferring movement of the transfer slide 139 moves the pivotal center of the transfer pawl 140 closer to the shaft of the totalizer upon which the ratchet wheels are journaled and thereby as the ratchet wheel is turned the transfer pawl is gradually elevated until it reaches normal position when the trip pawl 138 snaps under the shoulder 141 and thereby retains the transfer pawl again in normal position until it is again dropped. When the machine is given a rapid operation it might sometimes happen that the spring 138$^a$ would not act quickly enough, thereby causing a transfer to be missed. To guard against this there is formed on the tripping pawl 138 a camming projection 138$^b$ which, when the tripping projection of the counter wheel engages the tripping pawl 138, will strike a projection 140$^a$ of the transfer pawl 140 and cam said transfer pawl downwardly positively. The projection 140$^a$ will, when the pawl 140 is returned engage the projection 138$^b$ of the tripping pawl 138 and positively cam said tripping pawl 138 to normal position. The tripping of the pawls 138 usually occurs when the pinions are engaged with the actuating gears; but at other times the tripping occurs when the pinions and actuating gears are disengaged and because of a previous transfer. In either case the longitudinal movement of the transfer slide 139 to effect the transfer cannot occur until the pinions and actuating gears are out of mesh, so that the wheels can move independently of the actuating gears. The position of a totalizer in which a transfer takes place is intermediate the extreme upper and lower positions so that the adding pinions may be disengaged from the actuating gears and the totalizer wheel ratchets still remain in the paths of the spurs 145.

The transfer slides 139 are moved up and down at one end to follow the reciprocating movements of the totalizers. To accomplish this vertical movement, each of the transfer slides 139 has formed in one end thereof an L-shaped slot through which projects a supporting shaft 146. These slots allow both vertical and longitudinal movement of the transfer slides 139, and when said transfer slides are in their upper position they are locked against any longitudinal movement by the shaft 146 which at that time extends through the vertical portion of said slot. Through the longitudinal portion of the slot extends a rod 147 which with its supporting arms 148 forms a frame pivoted on the shaft 146. This rod is elevated and lowered to conform with the movements of the totalizers by a pitman 149 (Fig. 10) secured to one of the arms 148 and having mounted thereon two anti-friction rollers 150 adapted to be operated upon by a cam 151 secured to the shaft 48. The transfer device for the auxiliary reel totalizers is the same as for the main reel which has just been described. The transfer slides of the auxiliary reel are operated by pivoted arms 152 which are connected to the transfer slides 139 of the main reel transfer. A rod 153 serves the same purpose and is moved simultaneously with the rod 147 by the cam 151 as shown in Fig. 10.

*Main reel throwout.*—The three totalizers 116 of the auxiliary reel record the special transactions of "charge," "paid out" and "received on account" and the totalizer 117 records all of the cash transactions. When any one of the totalizers 116 is used to record the special transaction, it is desirable to disable the reciprocating mechanism of the main reel and prevent the actuation of any one of the main reel totalizers. The device for accomplishing this result is best shown in Figs. 4 and 8 and comprises a cam 155 mounted on the special indicator shaft 111 which is rotated by the setting of the auxiliary reel setting handle 103. An arm 156 is secured to a shaft 157 and is provided with an anti-friction roller 158 which travels in and is operated upon by a cam groove of the cam 155. On the end of the shaft 157 (Fig. 4) is mounted an arm 159 to which is connected a long link 160 the lower end of which has a pin and slot connection to a rocker arm 161 secured to the shaft 162. Connected to the opposite end of the rocker arm 161 is an upwardly extending link 163 in the upper end of which is an elongated slot surrounding a pin 164 mounted on the swinging plate 133. The slotted connections of the links 160 and 163 permit an independent movement of the shaft 162, the purpose of which will be hereinafter pointed out. A spring 165 connected to one end of the rocker arm 161 and to the framework of the machine tends to hold the rocker arm 161 in normal position. At 166 the cam groove 135 of the cam 136 is merged with an inner groove of said cam. Normally the anti-friction roller 134 occupies a position of the cam groove 135 just at the intersection of the same with the inner groove and outside the circle of the latter. In this normal adjustment of the parts, as above indicated, upon rotation of the cam 136 the swinging plate 133 will be rocked to cause the reciprocating bracket 130 to be raised to bring the selected totalizer into operative relation with the actuating gears, but it will be seen that if the swinging plate 133 is rocked before the rotation of the cam 136, the anti-friction roller 134 will be moved into the inner groove of said cam and no movement of the swinging plate 133 will ensue because only the concentric inner groove will be traversing the roller 134. Hence in order to prevent the selected totalizer from rising into operative relation with the operating gears it is necessary only to provide for a rocking movement of the shaft 162, which rocking movement is given by the cam 155 when the auxiliary reel is in any one of the three special transaction positions.

*Main totalizer throwout.*—It is desirable in this class of machine to have the main totalizer thrown out or prevented from operation when special transactions are to be recorded and added. This is done by the rocking of the shaft 162 which is controlled by the auxiliary reel to also throw out the main reel totalizers. Referring to Fig. 2 there is mounted loosely on the shaft 162 a frame 167 which is connected to the forward end of the link 60 by a link 168 and is adapted to be elevated when the shaft 162 is rocked, by an arm 177 which is secured to said shaft and projects under the frame 167. The elevating of the forward end of the link 60 will disconnect it from the pin 59 of the frame 58 thereby preventing the pinions 54 from being rocked into engagement with the driving gears 53 and the totalizer gears. This will prevent the registered amount of the special transaction from being added into the main totalizer. As thus far explained the main totalizer would give the same cash total that the cash totalizer 117 of the auxiliary reel which of course would be no additional function performed, but it may be stated that by not turning the main totalizer to zero at the close of each day's business the total may be allowed to accumulate from day to day for as long a period as desirable thereby giving the total of cash sales for the week, month or year. However, there is shown in the drawings a mechanism under the control of the main reel setting lever which causes the main totalizer to be thrown out when said lever is in certain predetermined positions. For illustration let it be assumed that in a grocery and butcher business there are two clerks in the meat department who are to use the first two positions of the main reel setting lever and seven clerks in the grocery department who are to use the remaining seven positions. When the lever is set for either of the first two positions the main totalizer will be thrown out and the meat sale would be recorded on one of the first two totalizers which are assigned to the meat department therefore it will be clear that the main totalizer will give only the cash total of sales made by the seven clerks in the grocery department while the cash totalizer on the auxiliary reel will total all cash sales in both departments. The meat department cash sales would be recorded on the two main reel totalizers assigned to the meat department and by adding the amounts of these totalizers the total cash sales of the meat department could be ascertained and the total cash sales for both departments will be shown by the cash totalizer 117 of the auxiliary reel. To cause this throwout of the main totalizer under control of the main reel, the mechanism shown in Figs. 2, 3 and 7 is utilized. Movable with segment 99 is a vertical beveled gear 170 meshing with a horizontal beveled gear 171 carrying a gear segment 172. This segment 172 as shown in Figs. 3 and 7 engages a rack 173 on a shaft 174, the shaft being enlarged at the point where the rack is cut therein. As shown in Fig. 7 the rack teeth 173 are curved so that the shaft 174 may be rocked without carrying the teeth 173 away from segment 172.

The structure described clearly provides for a differential movement of the shaft 174 axially corresponding to the extent of movement given lever 97. Rigidly mounted on this sliding shaft is an arm 175 shown in Figs. 2 and 3 under the forward end of the frame 167. A series of holes are bored in said frame directly over the path of the inner end of the arm 175 and in any desired holes pins 176 may be placed. In Fig. 3 the pins are inserted in position such that the arm 175 will be directly under them when the lever 97 is in either of its first two positions. This shaft 174 has a spline in which is a key 178 connecting said shaft to an upwardly extending arm 178ᵃ (Fig. 2) which in turn is connected through a link 179 and to an arm 180 on the main shaft 12. When the main shaft is oscillated by the operation of the machine, the shaft 174 will also be oscillated and the arm 175 carried thereby raised and it will be clear that if when the arm 175 is raised it has been moved under one of the pins 176, the frame 167 will also be raised as was the case when the arm 177 was operated.

The raising of the bar 168 through a pin 176 will clearly serve to prevent the operation of the main totalizer and it will be observed that this construction provides not only for throwing out the main totalizer at the desired lever positions but for adjusting the pins 176 so that the throwout of the main totalizer may be changed from one lever position to another.

*Locking mechanism.*—In the patents previously referred to, the setting lever of the main reel serves to unlock the machine and this function is performed by the setting lever in the present invention, though the parts are not all shown herein. Mounted on the lever 97 as shown in Fig. 7 is a pinch lever 181 pivoted on the pin 182. The arm 183 of this lever is normally over and engages a slide 184 mounted through links 185 and 186 on the lever 97. The link 186 carries an arm 187 adapted, when the pinch lever 181 is operated, to engage and be stopped by the pin 188 on the lever 97. On the slide 184 is a lug 189 having beveled edges and directly over this lug is a frame piece 190 having depressions 192 corresponding in shape to the bevel part of the lug 189. Normally the lug 189 engages and is retained by some one of the depressions 192 as shown in the figure. A cut away portion (not shown) of the lug 189 allows it to ride over a segment 193 carried by means of pin and slot connections 194 and 195 on connected arms 196 and 197. These arms are pivoted respectively at 199 and 198 and are connected at their adjacent ends by a pin and slot connection 200. The upper arm 196 has a rearwardly projecting arm 201 the upper edge of which engages the projection 202 on the release shaft 203. The shaft 199 upon which arm 196 is mounted serves to throw a second arm 204 (Fig. 11) into the path of a disk 205 mounted on the rotation shaft 22 and having a cut away portion normally opposite said arm so that when pinch lever 181 is operated and the slide 184 is lowered the lug 189 will engage and move downwardly the segment 193 thereby rocking arm 196 and shaft 199 and so throwing the arm 204 into the notch of the disk 205. This evidently locks the machine until the pinch lever is allowed to return to normal position thereby elevating the lug 189, and it will be seen that this lug cannot be elevated unless it is directly opposite one of the depressions 192 of the segment 190. The machine is therefore locked when the lever 97 is out of any one of its nine positions. The regular machine lock is controlled from the shaft 203 in the manner shown in the patent to Carroll above referred to, and will be next described.

As is common in this class of machines, the power is supplied by the turning of a rotatable crank handle and through a train of gears such as is shown in Fig. 12. The rotation shaft 22 is given one complete rotation at each operation of the machine. As shown in Fig. 19 there is a disk 206 mounted on a shaft 207 and having a notch 208 on its periphery adapted to be normally engaged by an arm 209 mounted on the shaft 203. As shaft 207 is connected to the gear train on Fig. 12 it will be seen that before the machine can be operated the pinch lever 181 must also be operated to rock the shaft 203 thereby causing the arm 209 to be disengaged from the notch 208 of the disk 206. To prevent the machine being operated while the auxiliary reel is in any intermediate position there is provided a disk 210 (Fig. 8) having four notches cut therein and mounted upon the special indicator shaft 111. A bell crank lever 211 pivoted at 212 is positioned so that its upper end will pass into said notches and has at its lower end a hooked nose which is adapted when the auxiliary reel is in an intermediate position to engage a projection 213 mounted upon the shaft 203. The lever 211 is spring drawn to the position shown in Fig. 8 by a spring 214 interposed between said lever and the pitman 126.

*Reel alinement.*—In order to insure the gears of the totalizer wheels being thrown squarely into mesh with the actuating gears and for the purpose of preventing the reels from being unintentionally turned, an alining mechanism is provided for each reel. This alining device for the main reel is shown on Fig. 7 and comprises an arm 201 having a block 215 mounted thereon. Fig. 7 shows the parts in normal position and it will be seen that in the slot of block 215 is the shaft 96 of one of the totalizers, clearly the totalizer frame cannot be rotated. When the pinch lever 181 is operated the arm 201 is raised, as before stated, thereby carrying the slot in block 215 away from its normal position surrounding one of the shafts 96. In this elevated position of block 215, clearly the totalizer frame may rotate. When the pinch lever is released the arm 201 rocks downwardly carrying the slot in block 215 around the shaft 96 of that one of the totalizers which is to be operated. When the totalizer frame is raised to engage the totalizer with the operating devices, its shaft 96 traverses the slot in block 215 so that the reel is prevented from being displaced and will guide the totalizer accurately as it rises into registering position. It will be seen that the block 215 blocks the totalizer frame at all times except when the pinch lever 181 has been operated, but when this lever has been operated the totalizer frame is then released and may be rotated.

The alining device for the auxiliary reel consists of an alining arm 216 and an operating pitman 217 therefor operated by the cam 218 mounted upon the rotation shaft 22. The forward end of the alining arm 216 is slotted to receive the ends of the totalizer shafts 118 but as shown in Fig. 7 the alining arm 216 is normally lowered out of engagement with the said shafts. The formation of the cam 218 is such that at the beginning of the operation of the machine the alining arm 216 is elevated before the downward movement of the auxiliary reel and before disengagement of the gears 113 and 112 takes place, so that the slot of the alining arm straddles one of the shafts 118 and thus holds the auxiliary reel from being displaced from its set position. The slot of the alining arm 216 will insure the gears of the totalizers meshing accurately with the actuating gears.

*Turn-to-zero.*—Any suitable turn-to-zero device may be provided for the auxiliary reel totalizers but for the main reel totalizers there is shown an improved turn-to-zero device which will now be described. There is as shown in Fig. 9 the usual pawl and groove connection between the totalizer wheels and their shafts. On the outer end of the totalizer shafts are mounted a series of gear pinions 220 shown in Fig. 4 which mesh with a large gear wheel 219 loosely mounted upon the main reel shaft 94. The outer ends of the shafts 96 are notched to accommodate a turn-to-zero wrench which is inserted through an aperture in the cabinet of the machine and also through an aperture 221 in the side frame as shown in Fig. 4. It will be seen from this construction that when any one of the main reel totalizers is turned to zero the intermediate gear connections will cause all of the remaining main reel totalizers to turn to zero simultaneously. Pivoted at 222 in the side frame of the machine is a shield which is adapted when in normal position to conceal the turn-to-zero aperture 221 in the side frame of the machine. This shield is operated by a key lock 223 and when so operated brings an opening 224 in said shield into alinement with the turn-to-zero aperture 221 thereby allowing the insertion of the turn-to-zero wrench. It is desirable that when said shield is so operated, the machine be locked from operation until the totalizers have been returned to zero and said shield returned to its normal position. To accomplish this locking of the machine there is provided a slotted arm 225 which is adapted to be operated by a pin 226 mounted upon the shield. The arm 225 is secured to a shaft 227 which as shown in Fig. 7 has mounted thereon a depending projection 228, adapted, when shaft 227 is rocked to be moved into the path of a projection 229 mounted upon the releasing shaft 203. From this construction it will be plain, that when the shield is moved to a position to disclose the turn-to-zero aperture, the shaft 227 will be rocked to block the releasing shaft 203 from releasing movement.

*Lock when drawer is open.*—As shown in Fig. 19 there is provided a cash drawer 230 which is released and ejected at each operation of the machine. The retaining and releasing devices of the cash drawer are not shown herein as they constitute no part of the present invention. Mechanism is provided whereby the machine will be locked until the cash drawer has been returned to its normal position but as it may be desirable at times to disable this mechanism so that the machine may be operated regardless of the position of the cash drawer there is provided a means for disabling this locking mechanism. This locking mechanism consists of a bell crank lever 231 pivoted loosely on the rotation shaft 22 and whose forwardly extending arm is adapted to be moved into the path of a projection 232 mounted upon the releasing shaft 203. The downward extension of the lever 231 is provided with a pin 233 which is adapted to be engaged by the forward edge of the upper arm of a bell crank lever 234 which extends downwardly into the path of movement of the rear end of the cash drawer. In the position shown in Fig. 19 the rear end of the cash drawer will, through the lever 234 and pin 233 hold the forward end of the bell cranked lever 231 out of the path of movement of the projection 232 but when the cash drawer is moved outwardly during an operation of the machine the forward end of the lever 231 will drop into engagement with said locking projection and lock the machine from another operation. A pin 235 mounted upon the bell crank lever 231 is surrounded by a slot 236 in a link 237 connected through a rocker arm 238 and link 239 to a key operated lock 240. When the key lock is rotated in the direction of the arrow as shown, the rearward end of the slot 236 will be moved into contact with the pin 235 and will thereby prevent any locking movement of the lever 231 even if the drawer is permitted to open.

*Flash mechanism.*—There is provided (Fig. 1) the usual form of indicators mounted on the shaft 241 and connected for control by the different banks of keys and also a special transaction indicator 241ᵃ mounted on the special indicator shaft 111. Also mounted on the shaft 241 and 111 are flash arms 242 and 243 which are formed with segments 244 and 245, connected to move simultaneously by intermediate gear pinions as shown in Fig. 1. The flash arms 242 and 243 carry the usual screen plates 246 and a spring 247 connected to the flash arm 242 and to the framework of the machine tends to move the screen plates 246 to concealing positions. The flash arms are held in normal position as shown in Fig. 1, by a spring pressed pawl mounted on the gear segment 244 and engaging an arm 248 which is oscillated at each operation of the machine by a pitman 249 and cam 250. To release the pawl to permit the flashes to be spring drawn to concealing position there is provided a lateral projection 251 forming part of a lever 252 (Fig. 11) which is operated through the arm 204 and shaft 199 by the pinch lever 181 of the main reel setting mechanism. A stop pin 253 is provided to limit the movement of the flashes toward concealing position. Thus it will be plain that when the pinch lever 181 is operated, the flashes will be tripped and will move to concealing position and upon operation of the machine the cam 250 will cause the arm 248 to be oscillated to again engage the spring pressed pawl and return it to normal position at the final degree of operation of the machine.

*Operation counters.*—In order to keep a record of the number of operations of the auxiliary reel totalizers there is provided a series of operation counters 255 (Fig. 12) one only of which is shown in the drawings. These counters are mounted upon a shaft 256 which is journaled on a suitable bracket attached to the main frame, and are actuated by operating pawls 257 which are mounted upon actuating arms 258 pivoted upon a shaft 259 and spring pressed to the normal position by suitable springs which surround said shaft and are hooked over the upper edges of said arms. The actuating arms 258 are provided with rearward extensions which are adapted to be operated upon to actuate their respective counters by reciprocating arms 260 which are pivoted at 261 to a series of connecting arms 262 rigidly secured to a shaft 263. Rigidly mounted on shaft 263 is a depending arm 263ª whereby said shaft is given oscillatory movement at each operation of the machine through the agency of the cam 264, and roller 263ᶜ on said arm 263ª. The arms 260 are all depressed at each operation of the machine but the arms corresponding to the operated transaction totalizer is the only one of the arms effective to actuate the special or operation counter. To accomplish this the indicator shaft 111 is provided with four disks 265 having each a cam groove in which a roller on a bell crank lever 266, rides. The four levers 266 are connected by pin and slot connections to the actuating arms 260, whereby the arms may move up or down without effecting the levers but forward and rearward movements of the levers carry the arms also. The dips in the cam grooves in disks 265, are successively arranged in different radial directions so that one only of the rollers on levers 266 at a time will be engaged by the dip in its groove. The lever 266 whose roller is in the dip of the groove of its disk 265 will be rocked, thereby moving forward the proper arm 260 so that when the shaft 207 is rotated and the arms 260 depressed, the proper lever 258 will be engaged and moved and one unit added to the reading of the operation counter according to the kind of transaction entered in the register. The actuating pawl 257 is of the well known three tined type and the counter is also of well known construction, namely that of the deep notched transfer type, therefore, no special description of the counters themselves is deemed necessary.

*Printing mechanism.*

*Type carriers.*—Mounted upon the rearward portion of the main operating segment 13 (Fig. 1) of each bank of keys is an antifriction roller 267 which projects into a curved slot 268 formed in an arm 269. These arms are mounted, respectively, on nested sleeves 270 which are supported by a transverse rocking shaft 271. The shaft 271 is also provided with an arm 269 which is positioned by the main reel operating lever 97. The formation of the slots 268 is such that when the segments 13 are operated, the arms 269 will be correspondingly rocked and the sleeves 270 moved to positions corresponding to the value of the keys operated. The right hand end of each of these sleeves and of the shaft 271 is provided with a segmental rack 272 (Fig. 12) all of which mesh with a series of pinions 273 fast upon the ends of a number of nested sleeves which are mounted upon a short shaft journaled in the frame work of the machine. The outer ends of these sleeves carry (Fig. 16) a series of type wheels 274 each of which is provided with duplicate series of types from "0" to "9" inclusive, whereby impressions may be taken from above as well as below said wheels. A special type wheel similar to the type wheels 274 is provided and is positioned by a segment 275 (Fig. 12) which is connected to a pitman 276, straddling the shaft 107 (Fig. 14) and reciprocated to position this special type wheel by cam 277 which is rigidly secured to the shaft 107 which, as before stated, is positioned by the auxiliary reel setting handle 103. Thus it is plain that the special type wheel will be set to one of four positions corresponding to the four positions of the auxiliary reel. The special type wheel is provided on its upper and lower periphery with characters representing the special transactions "Charge", "Received on account" and "Paid out" and also a special character representing the "Cash" position of the auxiliary reel. Each of the type wheels is provided with an alining disk 278 (Fig. 16) formed with a series of beveled alining teeth. A locking plate provided with a series of alining teeth, one opposite each type wheel, is pivotally mounted upon a stud 280 and is operated by an operating arm 280ª carrying near its rear end an anti-friction roller 281 projecting into the cam groove of a box cam 282, which is journaled upon the shaft 283 and is provided with a gear wheel 284 (Fig. 12) by means of which motion is transmitted thereto, from a gear wheel 285 mounted upon the rotation shaft 22. At 386 (Fig. 16) there is an adjustable eccentric connection by which the timing of alinement of the printing wheels can be regulated. By the above described means the type wheels are alined and locked after they are set, and held in a locked position during the printing operation, the shape of the groove in cam 282 being such as to produce this effect.

As above stated, these type wheels are capable of simultaneously printing a detail strip 287 (Figs. 15 and 16) and a check strip 288, which are arranged above and below the same respectively. The detail strip is forced against the type by a platen roller 289, formed of any suitable resilient material. The detail strip 287 passes from supply roller 290, mounted upon a bracket or frame 291 around the platen 289 and thence to the storage and winding roller 292. This latter roller is also mounted upon the bracket 291 which is pivotally mounted at 293 upon the framework of the machine. The bracket or frame 291 receives an oscillating movement from a box cam 294, fast upon the shaft 283. A bell crank arm 295 is pivotally mounted upon the stud 293 and is provided at one end with an anti-friction roller 296 which projects into the cam groove of the box cam 294. The formation of this cam groove is such as to give the arm 295 a double oscillation during each operation of the machine. The first oscillation forces the ink-pads against the types which are in printing position, as hereinafter described and the second forces the detail strip into contact with the inked types. In order to secure the nicety of adjustment necessary in the operation of the platen 289, the frame 291 and the arm 295 are connected by two adjustable screw bolts 297 and 298. The bolt 297 passes through a lateral projection formed on the frame 291, and engages the upper surface of the arm 295. The bolt 298 passes through said arm 295 and engages a projection formed on the frame 291. By this means the frame 291 and arm 295 are rigidly connected but may be adjusted in relation to each other at will, to secure the proper pressure by the platen 289.

The storage roller 292 is provided with a toothed wheel 299 which is engaged by a spring pressed operating pawl 300 pivoted upon an actuating arm 301. This arm is loosely mounted upon the pivot of the receiving roller and has a curved slot 302 formed therein. A pin 303 mounted on an actuating link 304 projects into the curved slot 302 and when said link is vertically reciprocated, as will hereinafter be described, the actuating arm 301 will be oscillated thereby causing the pawl 300 to advance the storage roller 292 and bring a fresh surface of the detail strip 287 into printing position. The link 304 is pivoted to the bell crank arm 305 which is in turn pivoted at 293 and is adapted to be operated at each operation of the machine by a pin 306 mounted upon the cam 294. The link 304 has a downwardly extending blade 307 which rests upon the periphery of the paper on the receiving roll and by so doing, as the quantity of the paper increases will force the pin 303 farther away from the pivot of the receiving roll thereby decreasing the feeding movement of pawl 300, and equalizing the lineal feet of the detail strip 287. When the receiving roll 292 is full the pin 303 will be in such position as to engage a pin 308 mounted upon the pawl 300 and will force said pawl out of engagement with the toothed wheel 299 thereby discontinuing the feeding movement of the detail strip. A spring 309 is interposed between the frame 291 and the link 304 and tends to hold said link and the actuating arm 301 together with the pawl 300, in their normal positions.

It is sometimes desirable to advance the strip by a manually operated means to leave a blank space to separate different groups of transactions, as for example, the day transactions from the night transactions, or the morning transactions from the afternoon transactions, and for this purpose there is provided an oscillating plate 392 (Fig. 15) which is pivoted upon the pivot of the receiving roll 292 and has mounted thereon a feed pawl 393 engaging the toothed wheel 299. The plate 392 has cut in the upper edge thereof a slot 394 which is adapted to be engaged by an anti-friction roller 395 mounted upon a sliding plate 396. Said sliding plate 396 extends through the cabinet of the machine and is capable of being manually operated to advance the strip as desired.

*Inking devices.*—The device for inking the type wheels 274 includes two ink pad arms or holders 310 and 311. These arms or holders are pivotally mounted upon a rocker arm 312 (Fig. 16) which is connected by a pin and slot connection to a bell-crank arm 313 which is pivoted on the shaft 283. Mounted upon the arm 313 is an anti-friction roller 314 which is adapted to be engaged by a cam groove 315 of a cam which is mounted upon a shaft 316 which shaft receives motion through gear connections between it and the shaft 283. The formation of the cam groove 315 is such that the rocker arm 312 carrying the ink pads is oscillated to move the ink pads to positions between the platens and the type wheels. The first movement of the platen 289 will now force the ink pads against the types to ink the same, after which said ink pads will be returned to their normal positions. The second movement of the platen 289 forces the detail strip against the inked types to make the desired impression.

The ink pad arms or holders 310 and 311 are adapted to be swung away from the type wheels 274 to facilitate the replenishing of their inking surfaces and are connected to move simultaneously by a link 397. Spring plungers mounted upon the rocker arm 312 co-act with flat surfaces on the arms 310 and 311 to hold said arms yieldingly in either their normal or displaced position. If the arms 310 and 311 are left in their displaced position and the machine is operated, the arm 311 will be engaged by a nose 398 of the oscillating bell-crank arm 305 and be restored to normal position.

*Check printer.*—The check strip 288 passes from a check supply roller, Fig. 20, through an auxiliary printing device (to be later described) and through suitable guide chutes and forward through a knife-plate 317 and over a check platen 318. This platen is constructed of a suitable yielding material and is mounted upon a vertically sliding plate 319. Mounted on suitable guide pieces is carried a knife blade 320, the other cutting member comprising the plate 317 through the slot of which the check strip passes. The slide 319 is given two reciprocations during each operation of the machine, as hereinafter more fully described but the first of these movements is not sufficient to cause the knife 320 to engage and sever the check strip. The second movement of the slide causes the movable knife in conjunction with the knife plate 317, to sever the check from the check strip and leave it in position to be withdrawn by the operator. The slide 319 is given its vertical reciprocations by the lever 321, which is pivoted at its forward end to said slide and is pivoted at its rearward end to the framework of the machine. This lever is provided with a laterally projecting anti-friction roller 322, which projects into a groove 323 of a box cam secured to the inner end of a check feed roller 324. This feeding and pressure roller is mounted upon an eccentric sleeve on a shaft 325, journaled on the main frame, whereby when said sleeve is partly rotated the roller 324 will be moved out of feeding contact with the type roller 326, which is mounted immediately above the same upon the main frame. The feed roller 324 carries a gear 327, which meshes with a similar gear on the type roller 326 (Fig. 16). This gear on the type roller in turn meshes with a gear which is mounted upon the shaft 316 whereby it receives its motion. The type on the type roller 326 are inked by an absorbent ink roller 328, removably mounted on a bracket which is spring pressed toward said type roller. The type roller 326 may be made in the form of a drum and may contain suitable printing types. It is preferably constructed with a series of consecutive numbering and dating types as well as an advertising cut or plate which will print on the face of the check any desired information.

Below the above described printing mechanism there is an auxiliary or polychrome printing device which is adapted to print any suitable advertising matter on the back of the check in different colors. This auxiliary printing device is best shown in Figs. 15 and 16 and consists of two type rollers 330 and 331 and two feed or impression rollers 332 and 333. These rollers are geared together and receive rotary motion from a shaft 334 through an intermediate pinion 335 mounted thereon. Mounted on the inner end of shaft 334 (see Fig. 12) is another pinion 336 which is similar to the pinion 335 and is geared to a shaft 337. The shaft 337 extends into the machine (Fig. 19) and has mounted thereon a vertical beveled gear 338 meshing with a horizontal beveled pinion 339 which is fast to a vertical shaft 340, connected and receiving motion from the rotation shaft 22 through a pair of beveled gears as shown in the figure. From the described gear train it is plain that the rollers of the auxiliary printing device will be given one complete rotation at each operation of the machine. The impression rollers 332 and 333 are eccentrically mounted on shafts 341 and 342 whereby when said shafts are partly rotated said impression rollers will be lowered out of feeding contact with their respective type rollers though the gears still mesh. The mechanism for partly rotating the shafts 341 and 342, as well as the shaft 325 of the previously described printing device so as to move simultaneously with the shafts 341 and 342, will be hereinafter described. The type rollers 330 and 331 may have mounted thereon, any suitable type or electrotype plates which are inked in different colors by inking devices which will now be described. The inking device for the type roller 331 consists of a single ink roller 343 mounted on a bracket 344 (Figs. 16 and 17) which is secured to a short shaft 345 extending into a sleeve 346 mounted loosely in the frame work of the machine. A retaining arm 347 is secured by a set screw to the sleeve 346 and is provided with an ear 348 which hooks over one edge of the bracket 344 and prevents said bracket and consequently the ink roller 343 from being removed from the machine until the retaining arm 347 is given a counter clockwise movement to disengage the ear 348 from the edge of the bracket 344. There is interposed between a collar 349 turned on the sleeve 346, and the outer frame of the printer a coil spring 350 which through the retaining arm 347 and bracket 344 holds the ink roller 343 yieldingly against the type roller 331. A short plug 351 is inserted in and pinned to the inner end of the sleeve 346 and has cut therein a slot 352 which is adapted to be engaged and turned by a screw driver or other similar article which may be inserted into the sleeve to adjust the tension of the spring 350 but before this can be done it is of course necessary to remove the bracket 344 and to loosen the set screw of the retaining arm 347.

The inking device for the type roller 330 consists of two ink rollers 353 and 354 both of which are mounted in a bracket 355 pivoted at 356 and spring drawn to the normal position as shown in Fig. 16. This bracket 355 has a rearwardly extending arm 357 which has mounted thereon an anti-friction roller engaging a cam 358 secured to the type roller 330. It will be plain from this construction that the ink rollers 353 and 354 are alternately rocked into engagement with the type roller 330 and that any timing of this movement may be secured by changing the formation of the cam 358 or by providing a plurality of interchangeable cams. The ink rollers may be supplied with any colored inks desirable and it is obvious that a duplication of the inking device for the type roller 331 may be applied to one or all the type rollers as desired.

*Check feed throw out.*—As before stated a partial rotation of the shafts 325, 341 and 342 will cause their respective feed rollers to be lowered out of feeding contact with their respective type rollers thereby controlling the feeding of the check strip. To accomplish this result there are provided link connections between the shafts 325, 341 and 342 so that they will be rotated simultaneously. The shaft 325 of the feed roller 324 protrudes through the right hand side frame of the printing attachment and has mounted thereon a plate 359 (Figs. 16 and 18) having a handle mounted therein. This device is commonly called an "on and off" check device, that is, the "on" position provides for the issuing of a check, the "off" position being for the discontinuance of the check feed. The plate 359 is provided with a collar which has an inwardly projecting pin 360, engaging with a groove 361 formed in the shaft 325. By means of this pin and groove connection the shaft 325, and consequently shafts 341 and 342 may be rotated by hand, simply by turning the plate 359. This will rock the eccentric bearings of the feed rollers and thereby continue or discontinue the feed of the check strip. The link connections intermediate the shafts 325, 341 and 342 are arranged as follows:—On the shaft 325 (Fig. 12) is secured an arm 362 which is connected to a bell crank lever 363 through a pin and slot connection, the bell crank lever 363 being in turn connected to an arm 364 mounted rigidly on the shaft 341 of the feed roller 332. The shaft 341, and the shaft 342 of the feed roller 333 are connected together by arms 365 and link 366 (Fig. 16). The plate 359 is held in its set position by means of a depressible spring plunger 368 which projects into two suitable recesses formed in either end of a slot 367 formed in said plate (Fig. 18). The groove 361 in the shaft 325 is cut away as at 369 (Fig. 16) to allow the shaft 325 to have a movement independent of the plate 359 for a purpose later to be described. For preventing any manipulation of the plate 359 after the machine has been started there is provided a lever 370 (Fig. 12) pivoted on the frame work of the machine and connected to the arm 362 through a pin and slot connection. This lever 370 is provided at its upper end with an anti-friction roller 371. A disk 372 is mounted on the shaft of the gear 284 and is constructed with a raised rim 373 having an opening normally opposite the anti-friction roller 371 and through which the roller is adapted to pass. It will be seen, that when the plate 359 is turned to the "on" position, the lever 370 will be in the position shown with its anti-friction roller inside of the rim 373, but that after the machine has started to operate the rim 373 will pass in front of roller 371 and therefore prevent any manipulation of the "on and off" device. Conversely, if the device is set at the "off" position with the roller 371 outside of the opening the starting of the machine will bring the rim 373 in front of the roller 371 thereby preventing manipulation of the "on and off" device after the machine has been started.

It will be apparent from the construction just described that the clerk operating the machine may by the hand-manipulative plate 359 set the machine ready to issue a check or not, as desired, upon the operation of the crank-handle. However, there is provided means whereby even though this plate 359 is set in such manner as to prevent the issuing of a check, yet upon movement of the auxiliary reel setting handle 103 into one of the three positions designated for special transactions, the eccentric bearings of the feed-rollers will be rocked, to cause the feeding of the check. Such rocking is caused by their link connections, through a bell crank lever 374 which is connected by a link 375 to the lever 370 through a pin and slot connection 376. The lever 374 is operated by a cam 377 fast on the shaft 107 (Fig. 13). It is thus apparent that this throwing on of the check feed will take place when the auxiliary reel setting handle is set for any one of the special transactions, regardless of the fact that the hand-manipulative plate 359 has previously been set by the clerk to throw the check feed off, since the cut away portion 369 of the groove 361 will permit the shaft 325 to have a movement independent of the "on and off" plate 359.

*Check strip carrier.*—The check roll of paper (Fig. 20) is carried at 378 on a rotatable plate 379 which is mounted in a receptacle 380, hinged at 381 in the base of the machine, and adapted to be swung out from the machine to facilitate the replacing of said check roll. The check paper 288 passes through an opening in the side of the receptacle 380 and thence around two rollers 382 and 383 of a tension device and to the auxiliary printer as shown in Figs. 15 and 20. This tension device consists of the two rollers 382 and 383 which are mounted in a bracket pivoted loosely on a stationary rod 384 and spring drawn against a stop pin 385 by a spring 386 which is coiled around the rod 384 (Fig. 16) and having one end secured to a collar on the rod 384 and the other end hooked over a projection 387 of the bracket.

To prevent any retrograde movement of the check paper 288 there is pivoted at 389 a gripper block 390 (Fig. 15) having teeth on its forward end which engage the paper strip. This gripper block has a lateral projection 391 (Fig. 16) by which it can be manually operated to release the paper when it is desired to reverse the movement thereof.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows:

1. In a cash register the combination with a series of clerks' totalizers, a main rotatable reel carrying said clerks' totalizers, of a series of special transaction totalizers, an auxiliary reel carrying said special transaction totalizers, an operating mechanism for both series of totalizers, transfer mechanisms for each series of totalizers, and a single set of transfer cams for operating both transfer mechanisms.

2. In a cash register, the combination with a series of clerks' totalizers, a reel carrying said totalizers, an operating mechanism for said totalizers, a manually operated lever for rotating the reel, a pinch handle for said lever, a slotted plate for guiding and locking the reel in its set position operated by the pinch handle of the manually operated lever.

3. In a cash register, the combination with a series of accounting devices, a rotatable main reel containing said accounting devices, of a second series of accounting devices, a rotatable auxiliary reel containing said second series of accounting devices, of an operating mechanism for both series of accounting devices, a separate means for reciprocating each reel and means under control of the auxiliary reel for disabling the reciprocating means of the main reel.

4. In a cash register, the combination with a series of special transaction totalizers, a reel carrying said totalizers, an operating mechanism for said totalizers, and a setting device for manually bringing any one of said totalizers into operative relation with said operating mechanism, of a device normally locking said operating mechanism, and a latch for said locking device having connections to said setting device and constructed to latch said locking device when the reel is in position such that no totalizer is in operative relation with the operating mechanism.

5. In a cash register, the combination with a plurality of totalizers, of a rotatable reel containing said totalizers, an operating mechanism for operating the totalizers, a turn to zero device for each totalizer, a series of gear wheels mounted on the totalizer shafts and connection between said gear wheels whereby the turning to zero of one of the totalizers, will cause all of the remaining totalizers to be turned to zero with it.

6. In a cash register, the combination with a plurality of totalizers, of a rotatable reel containing said totalizers, an operating mechanism for the totalizers, a turn to zero device for each totalizer, means for causing all the totalizers to be turned to zero simultaneously with the turning to zero of any single totalizer, a frame supporting the rotatable reel and having an aperture therein permitting the insertion of a turn to zero wrench, a shield for concealing said aperture, a lock for removing the shield from the aperture, a lock for the operating mechanism, means for operating said last mentioned lock and means operated by the shield for locking said last mentioned lock from releasing movement until the shield has been returned to concealing position.

7. In a cash register, the combination with a series of special transaction totalizers, a reel containing said totalizers, an operating mechanism for said totalizers, a setting mechanism for the reel, an indicator for said reel under control of the setting mechanism, an operation counter for each of the special transaction totalizers, a series of operating members for said operation counters, a common operating means for giving the operating members a uniform excursion of movement at each operation of the machine, and a selecting means under control of the reel indicator for moving one of the operating members into operative relation with its respective operation counter before the commencement of movement of the common operating means.

8. In a cash register, the combination with a printing mechanism, a series of type carriers, means for positioning said type carriers, a platen, an inking device mounted pivotally whereby it may be swung away from the type carriers to facilitate the replenishing of the inking surfaces, an operating mechanism, and a restoring device operated by the operating mechanism, for restoring the inking device to normal position at the beginning of the operation of the operating mechanism.

9. In a cash register, the combination with a printing mechanism including type carriers, and means for taking impressions therefrom on a record material, of a receiving roller for said record material, a toothed wheel operating said roller, an oscillating arm having a slot and a pawl carried thereby having a projection, and positioned to engage said toothed wheel, a reciprocating arm having a pin riding in said slot and connected to engage the record material on said receiver roller, the pawl projection being positioned to be engaged by said pin when the maximum amount of the record material has been wound on said receiving roller.

10. In a cash register, the combination with a printing mechanism, of a plurality of type carriers, of a setting means for said type carriers, a receiving roll for a paper strip, a toothed wheel mounted on the receiving roll, a pawl engaging said toothed wheel, an oscillating member carrying said pawl, a reciprocating link for oscillating the pawl carrying member, an inking device mounted pivotally whereby it may be swung away from the type carriers to facilitate the replenishing of the inking surfaces, an operating mechanism, means operated by said operating mechanism for restoring the inking devices to normal position and for reciprocating the link to actuate the pawl carrying member of the receiving roll, said link being adjusted by the increasing of the quantity of paper on the receiving roll for equalizing the feed of the strip and for disengaging the pawl from the toothed wheel of the receiving roll when the roll is full.

11. In a cash register, the combination with a printing mechanism, type carriers for printing upon a paper strip, a receiving roll for the paper strip, a toothed wheel mounted upon the receiving roll, a pawl engaging said toothed wheel, an oscillating member carrying said pawl, a camming slot in said oscillating member, a manually operated reciprocating plate, and a camming member attached to the reciprocating plate and engaging the camming slot whereby upon reciprocation of said plate the pawl carrying member will be oscillated to cause the receiving roll to be rotated.

12. In a cash register, the combination with a printing mechanism, of a type roller, an impression roller, means for rotating both rollers, an ink roller for the type roller, a removable pivotally mounted bracket for the ink roller, an adjustable sleeve surrounding the pivot of the ink roller bracket, a manually operated retaining arm for the ink roller bracket mounted on the sleeve and bearing against said bracket, a handle projecting from the retaining arm whereby said arm may be rocked from engagement with the ink roller bracket to permit the removal of said bracket and ink roller, a frame supporting the adjustable sleeve, and a spring intermediate the adjustable sleeve and its supporting frame whereby an adjustable spring tension is transmitted to the ink roller through the sleeve, the retaining arm and the ink roller bracket.

13. In a polychrome printing device, the combination with a type carrying roller, an impression roller, two ink rollers, a frame supporting said rollers, and a means for reciprocating said frame whereby the ink rollers will be brought into inking position alternately.

14. In a cash register, the combination with a plurality of accounting devices, of a rotatable reel containing said accounting devices, a cam mounted to rotate with the reel, a bell-crank lever operated by said cam, a second lever, a link connection between said second lever and said bell crank lever, a printing device, type rollers, impression rollers, means for rotating said rollers, eccentric bearings for the impression rollers whereby they may be raised or lowered by the rotation of said eccentric bearings, link connections between the second lever and the eccentric bearings whereby the movement of the eccentrics is controlled by movement of the rotatable reel.

15. In a cash register, the combination with a printing mechanism, of a type roller, an impression roller, an eccentric bearing for said impression roller, a slotted plate for rocking the eccentric bearing of the impression roller whereby it will be moved into operative relation with the type roller, a spring for moving said impression roller out of operative relation with the type roller, latching notches at both ends of the slot in the plate, a spring plunger for engaging said notches to latch the plate in either of its two positions, and a pin and groove connection intermediate the plate and the eccentric bearing.

16. In a cash register, the combination with a containing casing, of a check strip receptacle comprising a cylinder pivoted to the casing near the front thereof, and having a portion of its lateral surface cut away to provide a passageway for the check strip.

17. In a cash register, the combination with a printing mechanism, a receptacle comprising a cylinder, said cylinder containing a roll of check paper and pivoted at a point eccentric to the roll, and a tension device intermediate the check roll and the printing device whereby an even tension of the paper is maintained at all times.

18. In a machine of the class described, the combination with a set of totalizer operating devices, and keys controlling the extent of movement thereof, of two groups of totalizer mechanisms, a movable frame supporting each group, separate manipulative devices having connections with said frames to bring any desired totalizers in the two groups respectively into operative relation with said operating devices, whereby transactions may be entered on said totalizers according to two separate classifications, and means for preventing an actuation of the totalizers of one group when certain of the totalizers of the other group are selected for operation.

19. In a machine of the class described, the combination with a set of totalizer operating devices, and keys controlling the extent of movement thereof, of two groups of totalizer mechanisms, separately mounted carriers for said groups, separate manipulative devices having connections respectively to the two totalizer carriers and constructed to bring any desired totalizers in said groups into operative relation with said operating devices, whereby two classifications of entries in said machine may be made on the groups of totalizers, and means for preventing an actuation of the totalizers of one group when certain of the totalizers of the other group are selected for operation.

20. In a machine of the class described, the combination with a set of totalizer operating devices and keys controlling the extent of movement thereof, of two groups of totalizing mechanisms, and separate manipulative devices having connections to bring any desired totalizers in the two groups respectively into operative relation with said operating devices, means for engaging the totalizers of said two groups independently with said operating devices, and connections from one group for disabling the engaging means for the other group.

21. In a machine of the class described, the combination with totalizer operating mechanism, of two groups of totalizers, separate carriers for the groups, means for independently moving said carriers to bring any desired totalizers in the groups into operative relation with said operating mechanism, devices for separately connecting totalizers in the two groups with said operating mechanism and connections whereby one of the carriers may disable the connecting devices of the other carrier.

22. In a machine of the class described, the combination with totalizer operating mechanism, of two groups of totalizers, means for independently adjusting said groups to bring any desired totalizer into operative relation with said operating mechanism, means for separately engaging totalizers in the two groups with said operating mechanism after the same has been brought into operative relation with said operating mechanism, and devices controlled by the movement of the totalizers of one group for preventing actuation of the engaging means for the other group.

23. In a machine of the class described, the combination with a plurality of totalizers, and separate shafts carrying said totalizers, of connections whereby a rotation of any of the shafts will readjust the totalizer element carried thereby to normal zero position, and means permanently connecting all said shafts.

24. In a machine of the class described, the combination with a plurality of totalizers, and separate shafts carrying said totalizers, of elements constructed to connect the totalizer elements to their supporting shafts whereby a rotation of any shaft will readjust the totalizer elements carried thereby to normal zero position, and gearing permanently connecting all said shafts whereby they may be all rotated together.

25. In a machine of the class described, the combination with a plurality of totalizers, and a rotatable carrier for all said totalizers, of helically positioned cams connected to be differentially adjusted by said carrier, a plurality of operation counters having operating levers, a plurality of arms given movement in a longitudinal direction at each operation of the machine, and connections from said cams for shifting said arms to a position for co-acting with the operating levers for said operation counter.

26. In a machine of the class described, the combination with a plurality of totalizers, and an equal number of operation counters having actuating arms, of means for differentially positioning said totalizers, a plurality of bars given movement in a longitudinal direction at each operation of the machine, and connections from the totalizer positioning means for selectively adjusting said bars into position for coacting with the operation counter actuating arms.

27. In a machine of the class described, the combination with totalizer operating devices, of two groups or classes of totalizers, a movable frame supporting each group, means for causing an operative relation between any desired totalizer of each group and said operating devices, whereby transactions may be entered according to two separate classifications, and means for preventing an actuation of the totalizers of one group when certain of the totalizers of the other group are selected for operation.

28. In a machine of the class described, the combination with totalizer operating devices, of two groups or classes of totalizers, a movable frame supporting each group, separate means for causing an operative relation between any desired totalizer of each group and said operating devices, whereby transactions may be entered on said totalizers according to two separate classifications, means for causing said operating devices to simultaneously actuate different denominational elements of the totalizers, and means for preventing an actuation of the totalizers of one group when certain of the totalizers of the other group are selected for operation.

29. In a machine of the class described, the combination with a plurality of groups of totalizers, of a movable frame supporting each group, a transfer mechanism of each group of totalizers, and a single set of operating devices for all of the transfer mechanisms.

30. In a machine of the class described, the combination with a plurality of groups of totalizers, of a movable frame for supporting each group, actuators common to the totalizers of each group, independent devices for moving the frames thereby selecting the totalizers of the various groups to be actuated, a transfer mechanism for each group of totalizers, and a single set of operating devices for all of the transfer mechanism.

31. In a machine of the class described, the combination with a totalizer, of actuators therefor, slides, transfer trip pawls and transfer carrying pawls, the latter operated from the slides, the said trip pawls when operated positively positioning the carrying pawls, and the carrying pawls when operated to effect a transfer, positively operating the trip pawls to restore the latter into position to latch the carrying pawls in operated positions.

32. In a machine of the class described, the combination with a plurality of totalizers, of a set of actuators therefor, means for establishing coöperative relation between any one of said totalizers and the actuators, and transfer mechanism, including trip pawls and carrying pawls common to said totalizers; the said trip pawls and carrying pawls being so constructed that the trip pawls when operated will positively position the carrying pawls and the latter when operated to effect a transfer will positively restore the trip pawls into position to latch the carrying pawls in inoperative positions.

33. In a machine of the class described, the combination with a series of totalizers, of a rotatable main reel carrying said totalizers, a second series of totalizers, a rotatable auxiliary reel containing said second series of totalizers, a separate set of actuators for each series of totalizers, separate means for bringing the totalizers of each series into engagement with their respective actuators, and devices under control of the auxiliary reel for disabling the means for bringing the main reel totalizers into engagement with their actuators.

34. In a machine of the class described, the combination with totalizer operating mechanism, of two groups of totalizers, means for independently adjusting said groups to bring any desired totalizer in each group into operative relation with said operating mechanism, separate means for engaging totalizers in the two groups with said operating mechanism after same have been brought into operative relation with said operating mechanism, and devices whereby placing certain totalizers of one group in operative relation to the operating mechanism will prevent the engaging of any totalizer of the other group.

35. In a machine of the class described, the combination with an operating mechanism, of a plurality of totalizers, a rotatable reel carrying said totalizers, a frame supporting the rotatable reel and having an aperture therein permitting the insertion of a turn to zero wrench, a shield normally covering said aperture and preventing the insertion of the wrench, manipulative means for moving said shield to uncover said aperture, and means preventing actuation of the operating mechanism while said aperture is uncovered.

36. In a machine of the class described, the combination with a main operating mechanism normally locked against operation, of manipulative means for unlocking same, a rotatable totalizer reel, a frame supporting said reel and having an aperture therein permitting the insertion of a turn to zero wrench, a shield normally covering said aperture and preventing the insertion of the wrench, manipulative devices for moving said shield to uncover the aperture to permit the insertion of the resetting wrench, and means disabling the aforesaid manipulative unlocking means until the shield has been returned to normal position.

37. In a machine of the class described, the combination with a printing mechanism, of a receptacle comprising a cylinder, said cylinder containing a roll of check paper and pivoted at a point eccentric to the roll, and a spring operated tension device intermediate the check roll and the printing device whereby an even tension of the paper is maintained at all times.

38. In a machine of the class described, the combination with a totalizer operating mechanism, of a main rotatable reel and a plurality of totalizers carried thereby; an auxiliary rotatable reel and a plurality of totalizers carried by same; a main totalizer; and independent means for rotating said main and auxiliary reels to bring any desired totalizer in each reel into operative relation to the totalizer operating mechanism, whereby transactions may be entered on a main reel totalizer, an auxiliary reel totalizer and the main totalizer by a single operation of the totalizer operating mechanism.

39. In a machine of the class described, the combination with a totalizer operating mechanism and value determining devices controlling the extent of movement thereof; of two groups of totalizer mechanisms; separate carriers for said totalizer mechanisms, manipulative devices connected to said totalizer carriers to bring any desired totalizers in each of said groups into operative relation with said operating devices, whereby transactions may be entered on said totalizers according to two separate classifications, and means for preventing an actuation of the totalizers of one group when certain of the totalizers of the other group are selected for operation.

40. In a machine of the class described, the combination with a set of totalizer operating devices and value determining keys controlling the extent of movement thereof, of a main totalizer; a main rotatable reel; a plurality of totalizers carried by said main reel; an auxiliary rotatable reel; a plurality of totalizers carried by said auxiliary reel; independent means for engaging the main totalizer, the main reel totalizers and the auxiliary reel totalizers with the totalizer operating devices; and means controlled from the auxiliary reel totalizers for disabling the said engaging means for the main totalizers and the main reel totalizers.

In testimony whereof I affix my signature in the presence of two witnesses.

EDWARD J. VON PEIN.

Witnesses:
R. C. GLASS,
CARL BEUST.